United States Patent
Xie et al.

(10) Patent No.: US 12,192,976 B2
(45) Date of Patent: Jan. 7, 2025

(54) COMMUNICATION METHOD, COMMUNICATION APPARATUS, TERMINAL DEVICE, AND NETWORK DEVICE

(71) Applicant: HUAWEI TECHNOLOGIES CO., LTD., Guangdong (CN)

(72) Inventors: Xinqian Xie, Beijing (CN); Zhiheng Guo, Beijing (CN); Yi Long, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 314 days.

(21) Appl. No.: 17/574,243

(22) Filed: Jan. 12, 2022

(65) Prior Publication Data

US 2022/0141822 A1 May 5, 2022

Related U.S. Application Data

(63) Continuation of application No. PCT/CN2020/100933, filed on Jul. 8, 2020.

(30) Foreign Application Priority Data

Jul. 12, 2019 (CN) .......................... 201910632072.0

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC .. H04W 72/0453; H04W 72/23; H04L 5/0098
See application file for complete search history.

(56) References Cited

U.S. PATENT DOCUMENTS

| | | | |
|---|---|---|---|
| 10,973,056 B2 * | 4/2021 | Jang | ...................... H04W 76/28 |
| 2010/0232382 A1 | 9/2010 | Gauvreau et al. | |

(Continued)

FOREIGN PATENT DOCUMENTS

| | | |
|---|---|---|
| CN | 109392142 A | 2/2019 |
| CN | 109698739 A | 4/2019 |

(Continued)

OTHER PUBLICATIONS

Office Action in Russian Appln. No. 2022103338, mailed on Oct. 19, 2023, 11 pages (with English translation).

(Continued)

*Primary Examiner* — Deepa Belur
(74) *Attorney, Agent, or Firm* — Fish & Richardson P.C.

(57) ABSTRACT

This application relates to a communication method, a communication apparatus, a terminal device, and a network device. The terminal device receives first signaling from the network device, where the first signaling indicates the terminal device to send a first uplink signal to the network device on a first uplink carrier, and the first signaling further indicates a first frequency. Further, the terminal device sets an operating frequency of the terminal device based on the first frequency after sending the first uplink signal on the first uplink carrier; or the terminal device sets an operating frequency of the terminal device based on the first frequency before an end moment of a time unit in which the first uplink signal is located.

20 Claims, 13 Drawing Sheets

(56) References Cited

U.S. PATENT DOCUMENTS

| | | | | |
|---|---|---|---|---|
| 2013/0114537 | A1* | 5/2013 | Lee | H04W 74/002 370/329 |
| 2017/0302419 | A1 | 10/2017 | Liu et al. | |
| 2019/0052328 | A1* | 2/2019 | Akula | H04L 5/001 |
| 2020/0045685 | A1* | 2/2020 | Rico Alvarino | H04L 5/0048 |
| 2021/0378046 | A1* | 12/2021 | Shimoda | H04B 7/022 |

FOREIGN PATENT DOCUMENTS

| | | |
|---|---|---|
| CN | 109803427 A | 5/2019 |
| EP | 3606239 A1 | 2/2020 |
| EP | 3681082 A1 | 7/2020 |
| RU | 2684199 C1 | 4/2019 |
| WO | 2014172868 A1 | 10/2014 |
| WO | 2019029368 A1 | 2/2019 |
| WO | 2019080817 A1 | 5/2019 |
| WO | 2019096273 A1 | 5/2019 |
| WO | 2019098907 A1 | 5/2019 |

OTHER PUBLICATIONS

3GPP TS 36.211 V13.11.0 (Jun. 2019), "3rd Generation Partnership Project; Technical Specification Group Radio Access Network;Evolved Universal Terrestrial Radio Access (E-UTRA);Physical channels and modulation(Release 13)," Jun. 2019, 176 pages.

3GPP TS 38.213 V15.6.0 (Jun. 2019), "3rd Generation Partnership Project;Technical Specification Group Radio Access Network;NR;Physical layer procedures for control(Release 15)," Jun. 2019, 107 pages.

3GPP TS 38.214 V15.6.0 (Jun. 2019), "3rd Generation Partnership Project;Technical Specification Group Radio Access Network;NR;Physical layer procedures for data(Release 15)," Jun. 2019, 105 pages.

3GPP TS 36.331 V15.6.0 (Jun. 2019), "3rd Generation Partnership Project;Technical Specification Group Radio Access Network;Evolved Universal Terrestrial Radio Access (E-UTRA);Radio Resource Control (RRC);Protocol specification(Release 15)," Jun. 2019, 960 pages.

3GPP TS 38.101-1 V16.0.0 (Jun. 2019), "3rd Generation Partnership Project;Technical Specification Group Radio Access Network;NR;User Equipment (UE) radio transmission and reception;Part 1: Range 1 Standalone(Release 16)," Jun. 2019, 268 pages.

Apple Inc., "FL Summary of remaining issues on potential enhancements to single Tx switched uplink for EN-DC," 3GPP TSG RAN WG1 #97, R1-1907756, Reno, USA, May 13-17, 2019, 16 pages.

PCT International Search Report and Written Opinion issued in International Application No. PCT/CN2020/100933 on Oct. 10, 2020, 15 pages (with English translation).

3GPP TR 21.905 V16.0.0 (Jun. 2019), "3rd Generation Partnership Project; Technical Specification Group Services and System Aspects; Vocabulary for 3GPP Specifications (Release 16)," Jun. 2019, 67 pages.

3GPP TS 36.213 V13.14.0 (2019-06), "3rd Generation Partnership Project; Technical Specification Group Radio Access Network; Evolved Universal Terrestrial Radio Access (E-UTRA); Physical layer procedures (Release 13)," Jun. 2019, 395 pages.

Extended European Search Report issued in European Application No. 20839631.7 on Sep. 20, 2022, 12 pages.

Huawei, HiSilicon, "SRS Carrier Switching involving SUL," 3GPP TSG-RAN WG1 Meeting #92bis, R1-1804284, Sanya, China, Apr. 16-20, 2018, 4 pages.

MTI, "UL Carrier Switch Considering SUL in RRC_Connected," 3GPP TSG-RAN WG2 NR Ad-hoc 1801, R2-1801463, Vancouver, Canada, Jan. 22-26, 2018, 5 pages.

* cited by examiner

COMMUNICATION METHOD, COMMUNICATION APPARATUS, TERMINAL DEVICE, AND NETWORK DEVICE

CROSS-REFERENCE TO RELATED APPLICATION

This application is a continuation of International Application No. PCT/CN2020/100933, filed on Jul. 8, 2020, which claims priority to Chinese Patent Application No. 201910632072.0, filed on Jul. 12, 2019. The disclosures of the aforementioned applications are hereby incorporated by reference in their entireties.

TECHNICAL FIELD

This application relates to the field of communication technologies, and in particular, to a communication method, a communication apparatus, a terminal device, and a network device.

BACKGROUND

For a wireless communication system operating in a time division duplexing (time division duplexing, TDD) mode, a downlink carrier and an uplink carrier of the system are carriers at a same carrier frequency. In a new radio (new radio, NR) technology in a 5th generation (5th generation, 5G) system, an uplink and downlink decoupling technology may be used. That is, a network device may perform uplink and downlink communication by using not only a TDD carrier (which may also be referred to as an unpaired carrier) at a frequency of F1 but also an additional uplink carrier. The additional uplink carrier is usually referred to as a supplementary uplink (supplementary uplink, SUL) carrier.

When the SUL carrier is configured, one antenna of a terminal device needs to be shared by two frequency bands, namely, an uplink carrier and the SUL carrier; but only one operating frequency can be set for one antenna in a period of time. Therefore, the terminal device needs to switch between two frequencies. Currently, when the terminal device performs frequency switching, a base station does not perceive the frequency switching, and the terminal device does not notify the base station. Therefore, when scheduling the terminal device, the base station does not learn of a specific frequency at which the terminal device currently operates. Consequently, the terminal device may not be properly scheduled.

SUMMARY

Embodiments of this application provide a communication method, a communication apparatus, a terminal device, and a network device, to schedule the terminal device relatively properly.

According to a first aspect, a first communication method is provided. The method includes: receiving first signaling from a network device, where the first signaling indicates to send a first uplink signal to the network device on a first uplink carrier, and the first signaling further indicates a first frequency; and setting an operating frequency based on the first frequency.

The method in the first aspect may be performed by a first communication apparatus. The first communication apparatus may be a communication device or a communication apparatus, for example, a chip system, that can support the communication device in implementing functions required by the method. Further, the communication device may be a terminal device. An example in which the communication device is the terminal device is used in the following description process to analyze effects.

In this embodiment of this application, the terminal device may set the operating frequency of the terminal device based on the first frequency indicated by the network device, so that the network device and the terminal device have a consistent understanding of the operating frequency of the terminal device. This facilitates efficient communication between the terminal device and the network device. For example, when scheduling the terminal device, the network device can learn of a current operating frequency of the terminal device. In this way, when performing scheduling, the network device can determine whether to indicate the terminal device to switch the operating frequency, so that the network device better schedules the terminal device.

With reference to the first aspect, in a possible implementation of the first aspect, the setting an operating frequency based on the first frequency includes:

setting the operating frequency based on the first frequency after sending the first uplink signal;

setting the operating frequency based on the first frequency before a first time period of sending the first uplink signal ends, where the first time period is a time domain resource used to send the first uplink signal; or setting the operating frequency based on the first frequency before an end moment of a time unit in which the first uplink signal is located arrives.

A specific manner in the foregoing manners that is to be used by the terminal device to set the operating frequency may be indicated by the network device. For example, the first signaling indicates one of the foregoing manners. Alternatively, a specific manner in the foregoing manners that is to be used by the terminal device to set the operating frequency may be stipulated in a protocol. In this case, an indication from the network device is not required.

With reference to the first aspect, in a possible implementation of the first aspect, the first frequency corresponds to the first uplink carrier, or the first frequency corresponds to a second uplink carrier.

If the first frequency corresponds to the first uplink carrier, a frequency at which the terminal device sends the first uplink signal to the network device is the first frequency. In this case, setting the operating frequency of the terminal device by the terminal device based on the first frequency is actually maintaining the operating frequency of the terminal device at the first frequency. Alternatively, if the first frequency corresponds to the second uplink carrier, a frequency at which the terminal device sends the first uplink signal to the network device is not the first frequency. In this case, setting the operating frequency of the terminal device by the terminal device based on the first frequency is switching the operating frequency from a frequency corresponding to the first uplink carrier to the first frequency.

With reference to the first aspect, in a possible implementation of the first aspect, the method further includes: receiving second signaling from the network device, where the second signaling indicates to send a second uplink signal to the network device on the first uplink carrier, the second uplink signal and the first uplink signal are in the same time unit, and the second uplink signal is after the first uplink signal.

The network device may schedule the terminal device to send the first uplink signal and the second uplink signal.

With reference to the first aspect, in a possible implementation of the first aspect, the setting the operating frequency based on the first frequency after sending the first uplink signal on the first uplink carrier includes: setting the operating frequency based on the first frequency after sending the first uplink signal and the second uplink signal; or the setting the operating frequency based on the first frequency before an end moment of a time unit in which the first uplink signal is located includes: setting the operating frequency based on the first frequency after the first uplink signal and the second uplink signal are sent and before the end moment of the time unit in which the first uplink signal is located.

When the terminal device has received the first signaling and the second signaling, the terminal device may continue to set the operating frequency based on the first signaling. In this case, the terminal device may set the operating frequency of the terminal device based on the first frequency after sending the first uplink signal and the second uplink signal. For example, the terminal device may set the operating frequency after completing sending both the first uplink signal and the second uplink signal. In this way, a process of setting the operating frequency does not affect, as much as possible, processes of sending the first uplink signal and the second uplink signal. Alternatively, the terminal device may set the operating frequency of the terminal device based on the first frequency after the first uplink signal and the second uplink signal are sent and before the end moment of the time unit in which the first uplink signal is located. This avoids, as much as possible, that the terminal device sets the operating frequency long after the first uplink signal and the second uplink signal are sent, so that the terminal device can set the operating frequency in a relatively timely manner. Alternatively, the terminal device may set the operating frequency of the terminal device based on the first frequency after sending the first uplink signal. In this way, if the first frequency is not the frequency corresponding to the first uplink carrier, the terminal device may still send the entire second uplink signal or a part of the second uplink signal if the terminal device sets the operating frequency to the frequency corresponding to the first uplink carrier again after setting the operating frequency based on the first frequency and if a time domain resource corresponding to the second uplink signal has not expired or has not completely expired, or the terminal device cannot send the second uplink signal if the terminal device does not set the operating frequency to the frequency corresponding to the first uplink carrier after setting the operating frequency based on the first frequency or if the terminal device sets the operating frequency to the frequency corresponding to the first uplink carrier again after setting the operating frequency based on the first frequency but a time domain resource corresponding to the second uplink signal has completely expired.

Alternatively, when the terminal device has received the first signaling and the second signaling, the terminal device may set the operating frequency based on an indication by the second signaling. For example, if the second signaling indicates a second frequency, the terminal device may set the operating frequency based on the second frequency. For example, the terminal device may set the operating frequency of the terminal device based on the second frequency after sending the first uplink signal and the second uplink signal. For example, the terminal device may set the operating frequency after completing sending both the first uplink signal and the second uplink signal. In this way, a process of setting the operating frequency does not affect, as much as possible, processes of sending the first uplink signal and the second uplink signal. Alternatively, the terminal device may set the operating frequency of the terminal device based on the second frequency after the first uplink signal and the second uplink signal are sent and before the end moment of the time unit in which the first uplink signal is located. This avoids, as much as possible, that the terminal device sets the operating frequency long after the first uplink signal and the second uplink signal are sent, so that the terminal device can set the operating frequency in a relatively timely manner.

According to a second aspect, a second communication method is provided. The method includes: sending first signaling to a terminal device, where the first signaling indicates the terminal device to send a first uplink signal to a network device on a first uplink carrier, and the first signaling further indicates a first frequency.

The method in the second aspect may be performed by a second communication apparatus. The second communication apparatus may be a communication device or a communication apparatus, for example, a chip system, that can support the communication device in implementing functions required by the method. Further, the communication device may be a network device. An example in which the communication device is the network device is used in the following description process to describe technical effects.

With reference to the second aspect, in a possible implementation of the second aspect, the first frequency is used to:

set an operating frequency by the terminal device based on the first frequency after the terminal device sends the first uplink signal on the first uplink carrier;

set an operating frequency by the terminal device based on the first frequency before a first time period of sending the first uplink signal on the first uplink carrier ends, where the first time period is a time domain resource used to send the first uplink signal; or set an operating frequency by the terminal device based on the first frequency before an end moment of a time unit in which the first uplink signal is located arrives.

With reference to the second aspect, in a possible implementation of the second aspect, the first frequency corresponds to the first uplink carrier, or the first frequency corresponds to a second uplink carrier.

With reference to the second aspect, in a possible implementation of the second aspect, the method further includes: sending second signaling to the terminal device, where the second signaling indicates the terminal device to send a second uplink signal to the network device on the first uplink carrier, the second uplink signal and the first uplink signal are in the same time unit, and the second uplink signal is after the first uplink signal.

For the technical effects of the second aspect or the possible implementations of the second aspect, refer to the description of the technical effects of the first aspect or the possible implementations of the first aspect.

According to a third aspect, a third communication method is provided. The method includes: sending a first uplink signal to a network device on a first uplink carrier; and setting an operating frequency of a terminal device based on a first condition.

The method in the third aspect may be performed by a third communication apparatus. The third communication apparatus may be a communication device or a communication apparatus, for example, a chip system, that can support the communication device in implementing functions required by the method. Further, the communication device is a terminal device. An example in which the communication device is the terminal device is used in the following description process to describe technical effects.

In this embodiment of this application, the terminal device may set the operating frequency based on the first condition, and a network device may learn that the terminal device sets the operating frequency based on the first condition, so that the network device can determine the operating frequency of the terminal device. For example, when scheduling the terminal device, the network device may determine whether to reserve a time period for the terminal device to set the operating frequency, to reduce a probability of discarding a signal by the terminal device, and improve signal transmission quality.

With reference to the third aspect, in a possible implementation of the third aspect, the first condition includes:

before an uplink signal is sent to the network device on an uplink carrier other than the first uplink carrier, the operating frequency corresponds to the first uplink carrier;

if no uplink signal is sent to the network device within first duration after the first uplink signal is sent, the operating frequency of the terminal device corresponds to the first uplink carrier within the first duration;

if no uplink signal is sent to the network device within second duration after the first uplink signal is sent, the operating frequency of the terminal device corresponds to a first frequency after the second duration; or if no uplink signal is sent to the network device within first duration after the first uplink signal is sent, the operating frequency of the terminal device corresponds to the first uplink carrier within the first duration; and if no uplink signal is sent to the network device within second duration after the first uplink signal is sent, the operating frequency of the terminal device corresponds to a first frequency after the second duration.

A specific implementation of the first condition may be configured by the network device, or may be stipulated in a protocol.

With reference to the third aspect, in a possible implementation of the third aspect, the first frequency is a predetermined frequency.

With reference to the third aspect, in a possible implementation of the third aspect, the predetermined frequency is determined based on a frequency corresponding to an uplink carrier on which a PUCCH is configured for the terminal device;

the predetermined frequency is determined based on first signaling received by the terminal device from the network device; or the predetermined frequency is a predefined frequency.

A specific implementation of the predetermined frequency is not limited in this embodiment of this application.

According to a fourth aspect, a fourth communication method is provided. The method includes: receiving a first uplink signal from a terminal device on a first uplink carrier; and determining an operating frequency of the terminal device. For example, the operating frequency of the terminal device may be directly determined, or it may be determined that the terminal device sets the operating frequency of the terminal device based on a first condition.

Alternatively, a network device receives a first uplink signal from a terminal device on a first uplink carrier, and schedules the terminal device with reference to an operating frequency of the terminal device after receiving the first uplink signal.

The method in the fourth aspect may be performed by a fourth communication apparatus. The fourth communication apparatus may be a communication device or a communication apparatus, for example, a chip system, that can support the communication device in implementing functions required by the method. Further, the communication device is a network device. An example in which the communication device is the network device is used in the following description process to describe technical effects.

With reference to the fourth aspect, in a possible implementation of the fourth aspect, the operating frequency of the terminal device is as follows:

before the terminal device sends an uplink signal to the network device on an uplink carrier other than the first uplink carrier, the operating frequency of the terminal device corresponds to the first uplink carrier;

if the terminal device sends no uplink signal to the network device within first duration after the terminal device sends the first uplink signal, the operating frequency of the terminal device corresponds to the first uplink carrier within the first duration;

if the terminal device sends no uplink signal to the network device within second duration after the terminal device sends the first uplink signal, the operating frequency of the terminal device corresponds to a first frequency after the second duration; or if the terminal device sends no uplink signal to the network device within first duration after the terminal device sends the first uplink signal, the operating frequency of the terminal device corresponds to the first uplink carrier within the first duration; and if the terminal device sends no uplink signal to the network device within second duration after the terminal device sends the first uplink signal, the operating frequency of the terminal device corresponds to a first frequency after the second duration.

With reference to the fourth aspect, in a possible implementation of the fourth aspect, for the first condition, refer to the description above.

With reference to the fourth aspect, in a possible implementation of the fourth aspect, the first frequency is a predetermined frequency.

With reference to the fourth aspect, in a possible implementation of the fourth aspect, the predetermined frequency is determined based on a frequency corresponding to an uplink carrier on which a PUCCH is configured for the terminal device;

the predetermined frequency is determined based on first signaling received by the terminal device from the network device; or the predetermined frequency is a predefined frequency.

For the technical effects of the fourth aspect or the possible implementations of the fourth aspect, refer to the description of the technical effects of the third aspect or the possible implementations of the third aspect.

According to a fifth aspect, a fifth communication method is provided. The method includes: sending an uplink signal on a first uplink carrier; and when the first uplink carrier corresponds to a default operating frequency, maintaining an operating frequency at the default operating frequency; or when the first uplink carrier does not correspond to a default operating frequency, setting an operating frequency to the default operating frequency.

The method in the fifth aspect may be performed by a fifth communication apparatus. The fifth communication apparatus may be a communication device or a communication apparatus, for example, a chip system, that can support the communication device in implementing functions required by the method. Further, the communication device is a terminal device. An example in which the communication device is the terminal device is used in the following description process to describe technical effects.

In this embodiment of this application, regardless of a frequency at which the terminal device sends the uplink signal to a network device, after the sending is completed, if the frequency is the default operating frequency, the terminal device continues to maintain the operating frequency of the terminal device at the default operating frequency; or if the frequency is not the default operating frequency, the terminal device may switch the operating frequency of the terminal device to the default operating frequency. This means that the terminal device continuously maintains the operating frequency at the default operating frequency. For example, when scheduling the terminal device, the network device can learn that the operating frequency of the terminal device is the default operating frequency.

With reference to the fifth aspect, in a possible implementation of the fifth aspect, the default operating frequency is a predetermined frequency.

With reference to the fifth aspect, in a possible implementation of the fifth aspect, the predetermined frequency is determined based on a frequency corresponding to an uplink carrier on which a PUCCH is configured for the terminal device;

the predetermined frequency is determined based on first signaling received by the terminal device from the network device; or the predetermined frequency is a predefined frequency.

A specific implementation of the predetermined frequency is not limited in this embodiment of this application.

According to a sixth aspect, a sixth communication method is provided. The method includes: sending first signaling to a terminal device, where the first signaling indicates a default operating frequency of the terminal device; and receiving an uplink signal from the terminal device on a first uplink carrier.

The method in the sixth aspect may be performed by a sixth communication apparatus. The sixth communication apparatus may be a communication device or a communication apparatus, for example, a chip system, that can support the communication device in implementing functions required by the method. Further, the communication device is a network device. An example in which the communication device is the network device is used in the following description process to describe technical effects.

With reference to the sixth aspect, in a possible implementation of the sixth aspect, the default operating frequency is determined based on a frequency corresponding to an uplink carrier on which a PUCCH is configured for the terminal device.

For the technical effects of the sixth aspect or the possible implementations of the sixth aspect, refer to the description of the technical effects of the fifth aspect or the possible implementations of the fifth aspect.

According to a seventh aspect, a communication apparatus is provided. For example, the communication apparatus is the foregoing first communication apparatus. The communication apparatus is configured to perform the method according to any one of the first aspect or the possible implementations of the first aspect. Specifically, the communication apparatus may include modules configured to perform the method according to any one of the first aspect or the possible implementations of the first aspect. For example, the communication apparatus includes a processing module and a transceiver module. The transceiver module may be one functional module. The functional module can complete both an information receiving function and an information sending function. Alternatively, the transceiver module may be a general term of a sending module and a receiving module. The sending module is configured to complete an information sending function, and the receiving module is configured to complete an information receiving function. For example, the communication apparatus is a terminal device.

The transceiver module is configured to receive first signaling from a network device, where the first signaling indicates the terminal device to send a first uplink signal to the network device on a first uplink carrier, and the first signaling further indicates a first frequency.

The processing module is configured to set an operating frequency based on the first frequency.

With reference to the seventh aspect, in a possible implementation of the seventh aspect, the processing module is configured to set the operating frequency of the terminal device based on the first frequency in the following manner:

setting the operating frequency based on the first frequency after the transceiver module sends the first uplink signal;

setting the operating frequency based on the first frequency before a first time period of sending the first uplink signal by the transceiver module ends, where the first time period is a time domain resource used to send the first uplink signal; or setting the operating frequency based on the first frequency before an end moment of a time unit in which the first uplink signal is located arrives.

With reference to the seventh aspect, in a possible implementation of the seventh aspect, the first frequency corresponds to the first uplink carrier, or the first frequency corresponds to a second uplink carrier.

With reference to the seventh aspect, in a possible implementation of the seventh aspect, the transceiver module is further configured to receive second signaling from the network device, where the second signaling indicates to send a second uplink signal to the network device on the first uplink carrier, the second uplink signal and the first uplink signal are in the same time unit, and the second uplink signal is after the first uplink signal.

With reference to the seventh aspect, in a possible implementation of the seventh aspect, the processing module is configured to set the operating frequency based on the first frequency in the following manner after the transceiver module sends the first uplink signal on the first uplink carrier: setting the operating frequency based on the first frequency after the transceiver module sends the first uplink signal and the second uplink signal; or the processing module is configured to set the operating frequency based on the first frequency in the following manner before the end moment of the time unit in which the first uplink signal is located: setting the operating frequency based on the first frequency after the transceiver module sends the first uplink signal and the second uplink signal and before the end moment of the time unit in which the first uplink signal is located.

For technical effects of the seventh aspect or the possible implementations of the seventh aspect, refer to the description of the technical effects of the first aspect or the possible implementations of the first aspect.

According to an eighth aspect, a communication apparatus is provided. For example, the communication apparatus is the foregoing second communication apparatus. The communication apparatus is configured to perform the method according to any one of the second aspect or the possible implementations of the second aspect. Specifically, the communication apparatus may include modules configured to perform the method according to any one of the second aspect or the possible implementations of the second aspect. For example, the communication apparatus includes a processing module and a transceiver module. The transceiver module may be one functional module. The functional module can complete both an information receiving function and an information sending function. Alternatively, the transceiver module may be a general term of a sending module and a receiving module. The sending module is configured to complete an information sending function, and the receiving module is configured to complete an information receiving function. For example, the communication apparatus is a network device.

The transceiver module is configured to send first signaling to a terminal device, where the first signaling indicates the terminal device to send a first uplink signal to the network device on a first uplink carrier, and the first signaling further indicates a first frequency.

With reference to the eighth aspect, in a possible implementation of the eighth aspect, the first frequency is used to:

set an operating frequency by the terminal device based on the first frequency after the terminal device sends the first uplink signal on the first uplink carrier;

set an operating frequency by the terminal device based on the first frequency before a first time period of sending the first uplink signal on the first uplink carrier ends, where the first time period is a time domain resource used to send the first uplink signal; or set an operating frequency by the terminal device based on the first frequency before an end moment of a time unit in which the first uplink signal is located arrives.

With reference to the eighth aspect, in a possible implementation of the eighth aspect, the first frequency corresponds to the first uplink carrier, or the first frequency corresponds to a second uplink carrier.

With reference to the eighth aspect, in a possible implementation of the eighth aspect, the transceiver module is further configured to send second signaling to the terminal device, where the second signaling indicates the terminal device to send a second uplink signal to the network device on the first uplink carrier, the second uplink signal and the first uplink signal are in the same time unit, and the second uplink signal is after the first uplink signal.

For technical effects of the eighth aspect or the possible implementations of the eighth aspect, refer to the description of the technical effects of the second aspect or the possible implementations of the second aspect.

According to a ninth aspect, a communication apparatus is provided. For example, the communication apparatus is the foregoing third communication apparatus. The communication apparatus is configured to perform the method according to any one of the third aspect or the possible implementations of the third aspect. Specifically, the communication apparatus may include modules configured to perform the method according to any one of the third aspect or the possible implementations of the third aspect. For example, the communication apparatus includes a processing module and a transceiver module. The transceiver module may be one functional module. The functional module can complete both an information receiving function and an information sending function. Alternatively, the transceiver module may be a general term of a sending module and a receiving module. The sending module is configured to complete an information sending function, and the receiving module is configured to complete an information receiving function. For example, the communication apparatus is a terminal device.

The transceiver module is configured to send a first uplink signal to a network device on a first uplink carrier.

The processing module is configured to set an operating frequency of the terminal device based on a first condition.

With reference to the ninth aspect, in a possible implementation of the ninth aspect, the first condition includes.

before an uplink signal is sent to the network device on an uplink carrier other than the first uplink carrier, the operating frequency of the terminal device corresponds to the first uplink carrier;

if no uplink signal is sent to the network device within first duration after the first uplink signal is sent, the operating frequency of the terminal device corresponds to the first uplink carrier within the first duration;

if no uplink signal is sent to the network device within second duration after the first uplink signal is sent, the operating frequency of the terminal device corresponds to a first frequency after the second duration; or if no uplink signal is sent to the network device within first duration after the first uplink signal is sent, the operating frequency of the terminal device corresponds to the first uplink carrier within the first duration; and if no uplink signal is sent to the network device within second duration after the first uplink signal is sent, the operating frequency of the terminal device corresponds to a first frequency after the second duration.

With reference to the ninth aspect, in a possible implementation of the ninth aspect, the first frequency is a predetermined frequency.

With reference to the ninth aspect, in a possible implementation of the ninth aspect, the predetermined frequency is determined based on a frequency corresponding to an uplink carrier on which a PUCCH is configured for the terminal device;

the predetermined frequency is determined based on first signaling received by the terminal device from the network device; or the predetermined frequency is a predefined frequency.

For technical effects of the ninth aspect or the possible implementations of the ninth aspect, refer to the description of the technical effects of the third aspect or the possible implementations of the third aspect.

According to a tenth aspect, a communication apparatus is provided. For example, the communication apparatus is the foregoing fourth communication apparatus. The communication apparatus is configured to perform the method according to any one of the fourth aspect or the possible implementations of the fourth aspect. Specifically, the communication apparatus may include modules configured to perform the method according to any one of the fourth aspect or the possible implementations of the fourth aspect. For example, the communication apparatus includes a processing module and a transceiver module. The transceiver module may be one functional module. The functional module can complete both an information receiving function and an information sending function. Alternatively, the transceiver module may be a general term of a sending module and a receiving module. The sending module is configured to complete an information sending function, and the receiving module is configured to complete an information receiving function. For example, the communication apparatus is a network device.

The transceiver module is configured to receive a first uplink signal from a terminal device on a first uplink carrier.

The processing module is configured to determine an operating frequency of the terminal device. For example, the processing module may directly determine the operating frequency of the terminal device, or may determine that the terminal device sets the operating frequency of the terminal device based on a first condition.

Alternatively, the transceiver module is configured to receive a first uplink signal from a terminal device on a first uplink carrier; and the processing module is configured to schedule the terminal device with reference to an operating frequency of the terminal device after the transceiver module receives the first uplink signal. For the operating frequency of the terminal device, refer to the description above.

The operating frequency of the terminal device is as follows:

before the terminal device sends an uplink signal to the network device on an uplink carrier other than the first uplink carrier, the operating frequency of the terminal device corresponds to the first uplink carrier;

if the terminal device sends no uplink signal to the network device within first duration after the terminal device sends the first uplink signal, the operating frequency of the terminal device corresponds to the first uplink carrier within the first duration;

if the terminal device sends no uplink signal to the network device within second duration after the terminal device sends the first uplink signal, the operating frequency of the terminal device corresponds to a first frequency after the second duration; or if the terminal device sends no uplink signal to the network device within first duration after the terminal device sends the first uplink signal, the operating frequency of the terminal device corresponds to the first uplink carrier within the first duration; and if the terminal device sends no uplink signal to the network device within second duration after the terminal device sends the first uplink signal, the operating frequency of the terminal device corresponds to a first frequency after the second duration.

With reference to the tenth aspect, in a possible implementation of the tenth aspect, the first frequency is a predetermined frequency.

With reference to the tenth aspect, in a possible implementation of the tenth aspect, the predetermined frequency is determined based on a frequency corresponding to an uplink carrier on which a PUCCH is configured for the terminal device;

the predetermined frequency is determined based on first signaling received by the terminal device from the network device; or the predetermined frequency is a predefined frequency.

For technical effects of the tenth aspect or the possible implementations of the tenth aspect, refer to the description of the technical effects of the fourth aspect or the possible implementations of the fourth aspect.

According to an eleventh aspect, a communication apparatus is provided. For example, the communication apparatus is the foregoing fifth communication apparatus. The communication apparatus is configured to perform the method according to any one of the fifth aspect or the possible implementations of the fifth aspect. Specifically, the communication apparatus may include modules configured to perform the method according to any one of the fifth aspect or the possible implementations of the fifth aspect. For example, the communication apparatus includes a processing module and a transceiver module. The transceiver module may be one functional module. The functional module can complete both an information receiving function and an information sending function. Alternatively, the transceiver module may be a general term of a sending module and a receiving module. The sending module is configured to complete an information sending function, and the receiving module is configured to complete an information receiving function. For example, the communication apparatus is a terminal device.

The transceiver module is configured to send an uplink signal on a first uplink carrier.

The processing module is configured to: when the first uplink carrier corresponds to a default operating frequency, maintain an operating frequency at the default operating frequency; or when the first uplink carrier does not correspond to a default operating frequency, set an operating frequency to the default operating frequency.

With reference to the eleventh aspect, in a possible implementation of the eleventh aspect, the default operating frequency is a predetermined frequency.

With reference to the eleventh aspect, in a possible implementation of the eleventh aspect, the predetermined frequency is determined based on a frequency corresponding to an uplink carrier on which a PUCCH is configured for the terminal device;

the predetermined frequency is determined based on first signaling received by the terminal device from a network device; or the predetermined frequency is a predefined frequency.

A specific implementation of the predetermined frequency is not limited in this embodiment of this application.

For technical effects of the eleventh aspect or the possible implementations of the eleventh aspect, refer to the description of the technical effects of the fifth aspect or the possible implementations of the fifth aspect.

According to a twelfth aspect, a communication apparatus is provided. For example, the communication apparatus is the foregoing sixth communication apparatus. The communication apparatus is configured to perform the method according to any one of the sixth aspect or the possible implementations of the sixth aspect. Specifically, the communication apparatus may include modules configured to perform the method according to any one of the sixth aspect or the possible implementations of the sixth aspect. For example, the communication apparatus includes a processing module and a transceiver module. The transceiver module may be one functional module. The functional module can complete both an information receiving function and an information sending function. Alternatively, the transceiver module may be a general term of a sending module and a receiving module. The sending module is configured to complete an information sending function, and the receiving module is configured to complete an information receiving function. For example, the communication apparatus is a network device.

The transceiver module is configured to send first signaling to a terminal device, where the first signaling indicates a default operating frequency of the terminal device.

The transceiver module is further configured to receive an uplink signal from the terminal device on a first uplink carrier.

With reference to the twelfth aspect, in a possible implementation of the twelfth aspect, the default operating frequency is determined based on a frequency corresponding to an uplink carrier on which a PUCCH is configured for the terminal device.

For technical effects of the twelfth aspect or the possible implementations of the twelfth aspect, refer to the description of the technical effects of the sixth aspect or the possible implementations of the sixth aspect.

According to a thirteenth aspect, a communication apparatus is provided. For example, the communication apparatus is the foregoing first communication apparatus. The communication apparatus includes a processor and a transceiver. The processor and the transceiver are configured to implement the method according to any one of the first aspect or the possible designs of the first aspect. For example, the communication apparatus is a chip disposed in a communication device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. For example, the communication device is a terminal device.

The transceiver is configured to receive first signaling from a network device, where the first signaling indicates the terminal device to send a first uplink signal to the network device on a first uplink carrier, and the first signaling further indicates a first frequency.

The processor is configured to set an operating frequency based on the first frequency.

With reference to the thirteenth aspect, in a possible implementation of the thirteenth aspect, the processor is configured to set the operating frequency based on the first frequency in the following manner:

setting the operating frequency based on the first frequency after the transceiver sends the first uplink signal;

setting the operating frequency based on the first frequency before a first time period of sending the first uplink signal by the transceiver ends, where the first time period is a time domain resource used to send the first uplink signal; or setting the operating frequency based on the first frequency before an end moment of a time unit in which the first uplink signal is located arrives.

With reference to the thirteenth aspect, in a possible implementation of the thirteenth aspect, the first frequency corresponds to the first uplink carrier, or the first frequency corresponds to a second uplink carrier.

With reference to the thirteenth aspect, in a possible implementation of the thirteenth aspect, the transceiver is further configured to receive second signaling from the network device, where the second signaling indicates to send a second uplink signal to the network device on the first uplink carrier, the second uplink signal and the first uplink signal are in the same time unit, and the second uplink signal is after the first uplink signal.

With reference to the thirteenth aspect, in a possible implementation of the thirteenth aspect, the processor is configured to set the operating frequency based on the first frequency in the following manner after the transceiver sends the first uplink signal on the first uplink carrier: setting the operating frequency based on the first frequency after the transceiver sends the first uplink signal and the second uplink signal; or the processor is configured to set the operating frequency based on the first frequency in the following manner before the end moment of the time unit in which the first uplink signal is located: setting the operating frequency based on the first frequency after the transceiver sends the first uplink signal and the second uplink signal and before the end moment of the time unit in which the first uplink signal is located.

For technical effects of the thirteenth aspect or the possible implementations of the thirteenth aspect, refer to the description of the technical effects of the first aspect or the possible implementations of the first aspect.

According to a fourteenth aspect, a communication apparatus is provided. For example, the communication apparatus is the foregoing second communication apparatus. The communication apparatus includes a processor and a transceiver. The processor and the transceiver are configured to implement the method according to any one of the second aspect or the possible designs of the second aspect. For example, the communication apparatus is a chip disposed in a communication device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. For example, the communication device is a network device.

The transceiver is configured to send first signaling to a terminal device, where the first signaling indicates the terminal device to send a first uplink signal to the network device on a first uplink carrier, and the first signaling further indicates a first frequency.

With reference to the fourteenth aspect, in a possible implementation of the fourteenth aspect, the processor is configured to generate the first signaling.

With reference to the fourteenth aspect, in a possible implementation of the fourteenth aspect, the first frequency is used to:

set an operating frequency by the terminal device based on the first frequency after the terminal device sends the first uplink signal on the first uplink carrier;

set an operating frequency by the terminal device based on the first frequency before a first time period of sending the first uplink signal on the first uplink carrier ends, where the first time period is a time domain resource used to send the first uplink signal, or set an operating frequency by the terminal device based on the first frequency before an end moment of a time unit in which the first uplink signal is located arrives.

With reference to the fourteenth aspect, in a possible implementation of the fourteenth aspect, the first frequency corresponds to the first uplink carrier, or the first frequency corresponds to a second uplink carrier.

With reference to the fourteenth aspect, in a possible implementation of the fourteenth aspect, the transceiver is further configured to send second signaling to the terminal device, where the second signaling indicates the terminal device to send a second uplink signal to the network device on the first uplink carrier, the second uplink signal and the first uplink signal are in the same time unit, and the second uplink signal is after the first uplink signal.

For technical effects of the fourteenth aspect or the possible implementations of the fourteenth aspect, refer to the description of the technical effects of the second aspect or the possible implementations of the second aspect.

According to a fifteenth aspect, a communication apparatus is provided. For example, the communication apparatus is the foregoing third communication apparatus. The communication apparatus includes a processor and a transceiver. The processor and the transceiver are configured to implement the method according to any one of the third aspect or the possible designs of the third aspect. For example, the communication apparatus is a chip disposed in a communication device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. For example, the communication device is a terminal device.

The transceiver is configured to send a first uplink signal to a network device on a first uplink carrier.

The processor is configured to set an operating frequency of the terminal device based on a first condition.

With reference to the fifteenth aspect, in a possible implementation of the fifteenth aspect, for the first condition, refer to the description above.

With reference to the fifteenth aspect, in a possible implementation of the fifteenth aspect, a first frequency is a predetermined frequency.

With reference to the fifteenth aspect, in a possible implementation of the fifteenth aspect, the predetermined frequency is determined based on a frequency corresponding to an uplink carrier on which a PUCCH is configured for the terminal device;

the predetermined frequency is determined based on first signaling received by the terminal device from the network device; or the predetermined frequency is a predefined frequency.

For technical effects of the fifteenth aspect or the possible implementations of the fifteenth aspect, refer to the description of the technical effects of the third aspect or the possible implementations of the third aspect.

According to a sixteenth aspect, a communication apparatus is provided. For example, the communication apparatus is the foregoing fourth communication apparatus. The communication apparatus includes a processor and a transceiver. The processor and the transceiver are configured to implement the method according to any one of the fourth aspect or the possible designs of the fourth aspect. For example, the communication apparatus is a chip disposed in a communication device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. For example, the communication device is a network device.

The transceiver is configured to receive a first uplink signal from a terminal device on a first uplink carrier.

The processor is configured to determine an operating frequency of the terminal device. For example, the processor may directly determine the operating frequency of the terminal device, or may determine that the terminal device sets the operating frequency of the terminal device based on a first condition.

Alternatively, the transceiver is configured to receive a first uplink signal from a terminal device on a first uplink carrier; and the processor is configured to schedule the terminal device with reference to an operating frequency of the terminal device after the transceiver receives the first uplink signal. The operating frequency of the terminal device is set based on a first condition.

For the operating frequency of the terminal device, refer to the description above.

With reference to the sixteenth aspect, in a possible implementation of the sixteenth aspect, for the first condition, refer to the description above.

With reference to the sixteenth aspect, in a possible implementation of the sixteenth aspect, a first frequency is a predetermined frequency.

With reference to the sixteenth aspect, in a possible implementation of the sixteenth aspect, the predetermined frequency is determined based on a frequency corresponding to an uplink carrier on which a PUCCH is configured for the terminal device;

the predetermined frequency is determined based on first signaling received by the terminal device from the network device; or the predetermined frequency is a predefined frequency.

For technical effects of the sixteenth aspect or the possible implementations of the sixteenth aspect, refer to the description of the technical effects of the fourth aspect or the possible implementations of the fourth aspect.

According to a seventeenth aspect, a communication apparatus is provided. For example, the communication apparatus is the foregoing fourth communication apparatus. The communication apparatus includes a processor and a transceiver. The processor and the transceiver are configured to implement the method according to any one of the fifth aspect or the possible designs of the fifth aspect. For example, the communication apparatus is a chip disposed in a communication device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. For example, the communication device is a terminal device.

The transceiver is configured to send an uplink signal on a first uplink carrier.

The processor is configured to: when the first uplink carrier corresponds to a default operating frequency, maintain an operating frequency at the default operating frequency; or when the first uplink carrier does not correspond to a default operating frequency, set an operating frequency to the default operating frequency.

With reference to the seventeenth aspect, in a possible implementation of the seventeenth aspect, the default operating frequency is a predetermined frequency.

With reference to the seventeenth aspect, in a possible implementation of the seventeenth aspect, the predetermined frequency is determined based on a frequency corresponding to an uplink carrier on which a PUCCH is configured for the terminal device;

the predetermined frequency is determined based on first signaling received by the terminal device from a network device; or the predetermined frequency is a predefined frequency.

A specific implementation of the predetermined frequency is not limited in this embodiment of this application.

For technical effects of the seventeenth aspect or the possible implementations of the seventeenth aspect, refer to the description of the technical effects of the fifth aspect or the possible implementations of the fifth aspect.

According to an eighteenth aspect, a communication apparatus is provided. For example, the communication apparatus is the foregoing sixth communication apparatus. The communication apparatus includes a processor and a transceiver. The processor and the transceiver are configured to implement the method according to any one of the sixth aspect or the possible designs of the sixth aspect. For example, the communication apparatus is a chip disposed in a communication device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. For example, the communication device is a network device.

The transceiver is configured to send first signaling to a terminal device, where the first signaling indicates a default operating frequency of the terminal device.

The transceiver is further configured to receive an uplink signal from the terminal device on a first uplink carrier.

With reference to the eighteenth aspect, in a possible implementation of the eighteenth aspect, the default operating frequency is determined based on a frequency corresponding to an uplink carrier on which a PUCCH is configured for the terminal device.

For technical effects of the eighteenth aspect or the possible implementations of the eighteenth aspect, refer to the description of the technical effects of the sixth aspect or the possible implementations of the sixth aspect.

According to a nineteenth aspect, a communication apparatus is provided. The communication apparatus may be the first communication apparatus in the foregoing method designs. For example, the communication apparatus is a chip disposed in a communication device. For example, the communication device is a terminal device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the first aspect or the possible implementations of the first aspect.

The communication apparatus may further include a communication interface. The communication interface may be a transceiver in the terminal device, and for example, is implemented by using an antenna, a feeder, and a codec in the communication apparatus. Alternatively, if the communication apparatus is the chip disposed in the terminal device, the communication interface may be an input/output interface of the chip, for example, an input/output pin.

According to a twentieth aspect, a communication apparatus is provided. The communication apparatus may be the second communication apparatus in the foregoing method designs. For example, the communication apparatus is a chip disposed in a communication device. For example, the communication device is a network device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the second aspect or the possible implementations of the second aspect.

The communication apparatus may further include a communication interface. The communication interface may be a transceiver in the network device, and for example, is implemented by using an antenna, a feeder, and a codec in the communication apparatus. Alternatively, if the communication apparatus is the chip disposed in the network device, the communication interface may be an input/output interface of the chip, for example, an input/output pin.

According to a twenty-first aspect, a communication apparatus is provided. The communication apparatus may be the third communication apparatus in the foregoing method designs. For example, the communication apparatus is a chip disposed in a communication device. For example, the communication device is a terminal device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the third aspect or the possible implementations of the third aspect.

The communication apparatus may further include a communication interface. The communication interface may be a transceiver in the terminal device, and for example, is implemented by using an antenna, a feeder, and a codec in the communication apparatus. Alternatively, if the communication apparatus is the chip disposed in the terminal device, the communication interface may be an input/output interface of the chip, for example, an input/output pin.

According to a twenty-second aspect, a communication apparatus is provided. The communication apparatus may be the fourth communication apparatus in the foregoing method designs. For example, the communication apparatus is a chip disposed in a communication device. For example, the communication device is a network device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the fourth aspect or the possible implementations of the fourth aspect.

The communication apparatus may further include a communication interface. The communication interface may be a transceiver in the network device, and for example, is implemented by using an antenna, a feeder, and a codec in the communication apparatus. Alternatively, if the communication apparatus is the chip disposed in the network device, the communication interface may be an input/output interface of the chip, for example, an input/output pin.

According to a twenty-third aspect, a communication apparatus is provided. The communication apparatus may be the fifth communication apparatus in the foregoing method designs. For example, the communication apparatus is a chip disposed in a communication device. For example, the communication device is a terminal device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the fifth aspect or the possible implementations of the fifth aspect.

The communication apparatus may further include a communication interface. The communication interface may be a transceiver in the terminal device, and for example, is implemented by using an antenna, a feeder, and a codec in the communication apparatus. Alternatively, if the communication apparatus is the chip disposed in the terminal device, the communication interface may be an input/output interface of the chip, for example, an input/output pin.

According to a twenty-fourth aspect, a communication apparatus is provided. The communication apparatus may be the sixth communication apparatus in the foregoing method designs. For example, the communication apparatus is a chip disposed in a communication device. For example, the communication device is a network device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the sixth aspect or the possible implementations of the sixth aspect.

The communication apparatus may further include a communication interface. The communication interface may be a transceiver in the network device, and for example, is implemented by using an antenna, a feeder, and a codec in the communication apparatus. Alternatively, if the communication apparatus is the chip disposed in the network device, the communication interface may be an input/output interface of the chip, for example, an input/output pin.

According to a twenty-fifth aspect, a communication system is provided. The communication system may include the communication apparatus in the seventh aspect, the communication apparatus in the thirteenth aspect, or the communication apparatus in the nineteenth aspect, and include the communication apparatus in the eighth aspect, the communication apparatus in the fourteenth aspect, or the communication apparatus in the twentieth aspect.

According to a twenty-sixth aspect, a communication system is provided. The communication system may include the communication apparatus in the ninth aspect, the communication apparatus in the fifteenth aspect, or the communication apparatus in the twenty-first aspect, and include the communication apparatus in the tenth aspect, the communication apparatus in the sixteenth aspect, or the communication apparatus in the twenty-second aspect.

According to a twenty-seventh aspect, a communication system is provided. The communication system may include the communication apparatus in the eleventh aspect, the communication apparatus in the seventeenth aspect, or the communication apparatus in the twenty-third aspect, and include the communication apparatus in the twelfth aspect, the communication apparatus in the eighteenth aspect, or the communication apparatus in the twenty-fourth aspect.

The communication system in the twenty-fifth aspect, the communication system in the twenty-sixth aspect, and the communication system in the twenty-seventh aspect may be a same communication system, or may be different communication systems; or two of the three communication systems may be a same communication system, and the other is a different communication system.

According to a twenty-eighth aspect, a computer storage medium is provided. The computer-readable storage medium stores instructions. When the instructions are run on a computer, the computer is enabled to perform the method according to any one of the first aspect or the possible designs of the first aspect.

According to a twenty-ninth aspect, a computer storage medium is provided. The computer-readable storage medium stores instructions. When the instructions are run on a computer, the computer is enabled to perform the method according to any one of the second aspect or the possible designs of the second aspect.

According to a thirtieth aspect, a computer storage medium is provided. The computer-readable storage medium stores instructions. When the instructions are run on a computer, the computer is enabled to perform the method according to any one of the third aspect or the possible designs of the third aspect.

According to a thirty-first aspect, a computer storage medium is provided. The computer-readable storage medium stores instructions. When the instructions are run on a computer, the computer is enabled to perform the method according to any one of the fourth aspect or the possible designs of the fourth aspect.

According to a thirty-second aspect, a computer storage medium is provided. The computer-readable storage medium stores instructions. When the instructions are run on a computer, the computer is enabled to perform the method according to any one of the fifth aspect or the possible designs of the fifth aspect.

According to a thirty-third aspect, a computer storage medium is provided. The computer-readable storage medium stores instructions. When the instructions are run on a computer, the computer is enabled to perform the method according to any one of the sixth aspect or the possible designs of the sixth aspect.

According to a thirty-fourth aspect, a computer program product including instructions is provided. The computer program product stores the instructions. When the instructions are run on a computer, the computer is enabled to perform the method according to any one of the first aspect or the possible designs of the first aspect.

According to a thirty-fifth aspect, a computer program product including instructions is provided. The computer program product stores the instructions. When the instructions are run on a computer, the computer is enabled to perform the method according to any one of the second aspect or the possible designs of the second aspect.

According to a thirty-sixth aspect, a computer program product including instructions is provided. The computer program product stores the instructions. When the instructions are run on a computer, the computer is enabled to perform the method according to any one of the third aspect or the possible designs of the third aspect.

According to a thirty-seventh aspect, a computer program product including instructions is provided. The computer program product stores the instructions. When the instructions are run on a computer, the computer is enabled to perform the method according to any one of the fourth aspect or the possible designs of the fourth aspect.

According to a thirty-eighth aspect, a computer program product including instructions is provided. The computer program product stores the instructions. When the instructions are run on a computer, the computer is enabled to perform the method according to any one of the fifth aspect or the possible designs of the fifth aspect.

According to a thirty-ninth aspect, a computer program product including instructions is provided. The computer program product stores the instructions. When the instructions are run on a computer, the computer is enabled to perform the method according to any one of the sixth aspect or the possible designs of the sixth aspect.

In the embodiments of this application, the network device can learn of the operating frequency of the terminal device, so that when scheduling the terminal device, the network device can determine whether to indicate the terminal device to switch the operating frequency. According to this method, the network device can learn of the current operating frequency of the terminal device, so that the network device can better schedule the terminal device.

DESCRIPTION OF EMBODIMENTS

Figure 1:
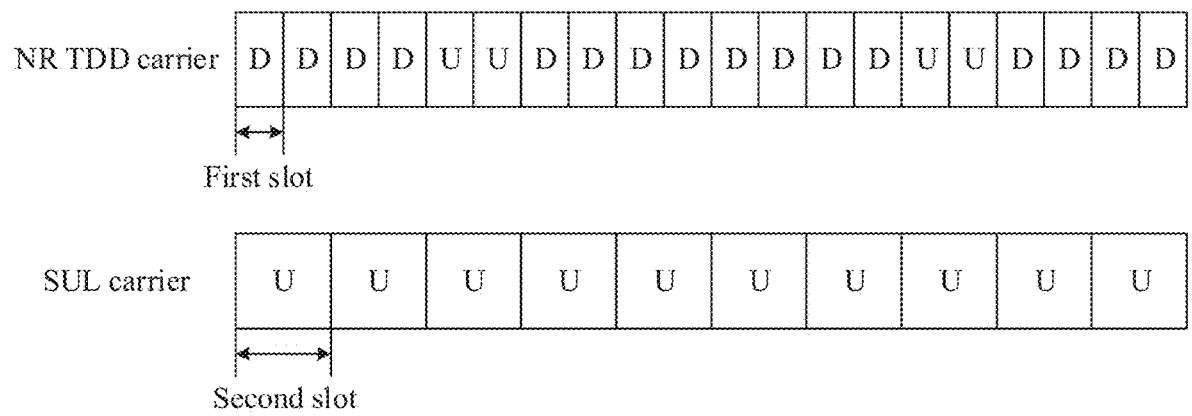
FIG. 1 is a schematic diagram of two uplink carriers of a network device/terminal device in time domain.

To make objectives, technical solutions, and advantages of embodiments of this application clearer, the following further describes the embodiments of this application in detail with reference to accompanying drawings.

The following explains and describes some terms in the embodiments of this application, to help a person skilled in the art have a better understanding.

(1) A terminal device includes a device that provides a voice and/or data connectivity for a user. Specifically, the terminal device includes a device that provides a voice for a user, includes a device that provides data connectivity for a user, or includes a device that provides a voice and data connectivity for a user. For example, the terminal device may include a handheld device having a wireless connection function or a processing device connected to a wireless modem. The terminal device may communicate with a core network through a radio access network (radio access network, RAN), and exchange a voice or data with the RAN, or exchange a voice and data with the RAN. The terminal device may include user equipment (user equipment, UE), a wireless terminal device, a mobile terminal device, a device-to-device (device-to-device, D2D) terminal device, a vehicle-to-everything (vehicle-to-everything, V2X) terminal device, a machine-to-machine/machine type communication (machine-to-machine/machine type communication, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device is a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device with relatively low power consumption, a device with a limited storage capability, or a device with a limited computing capability. For example, the terminal device includes an information sensor device such as a barcode, radio frequency identification (radio frequency identification, RFID), a sensor, a global positioning system (global positioning system, GPS), or a laser scanner.

As an example instead of a limitation, the terminal device in the embodiments of this application may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on a human body or integrated into clothes or an accessory of a user. The wearable device is not only a hardware device, but also is configured to implement powerful functions through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located on a vehicle (for example, placed in the vehicle or installed in the vehicle), the terminal devices may be considered as vehicle-mounted terminal devices. The vehicle-mounted terminal devices are also referred to as, for example, on-board units (on-board units, OBUs).

In the embodiments of this application, the terminal device may further include a relay (relay). Alternatively, it may be understood that any device that can perform data communication with a base station may be considered as the terminal device.

(2) A network device includes, for example, an access network (access network, AN) device such as a base station (for example, an access point), and may be a device that communicates with a wireless terminal device over an air interface through one or more cells in an access network. Alternatively, for example, a network device in a vehicle-to-everything (vehicle-to-everything, V2X) technology is a road side unit (road side unit, RSU). The base station may be configured to mutually convert a received over-the-air frame and an IP packet and serve as a router between a terminal device and a remaining portion of the access network, where the remaining portion of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB or eNB or eNodeB, evolved NodeB) in a long term evolution (long term evolution, LTE) system or a long term evolution-advanced (long term evolution-advanced, LTE-A) system, may include a next generation NodeB (next generation NodeB, gNB) in a 5th generation ($5^{th}$ generation, 5G) new radio (new radio, NR) system (also briefly referred to as an NR system), or may include a centralized unit (centralized unit, CU) and a distributed unit (distributed unit, DU) in a cloud radio access network (cloud radio access network, Cloud RAN) system. This is not limited in the embodiments of this application.

A receiving device in the embodiments of this application may be a terminal device, or may be a network device. Similarly, a sending device configured to send a data packet in the embodiments of this application may be a terminal device, or may be a network device. In addition, for example, in a case, the sending device is a network device, and the receiving device is a terminal device; in another case, both the sending device and the receiving device are network devices; in still another case, both the sending device and the receiving device are terminal devices. This is not specifically limited.

(3) Multi-radio access technology dual connectivity (multi-RAT dual connectivity, MR-DC): In an LTE system, a terminal device supports simultaneous access to two network devices. This access mode is referred to as dual connectivity (dual connectivity, DC). One of the two network devices is a master network device, and the other network device is a secondary network device. In a development and evolution process of a wireless communication system, an operator deploys both a 5G NR system and an LTE system, and a terminal device supports simultaneous access to an LTE network device and an NR network device. Because LTE is also referred to as evolved universal terrestrial radio access (evolved universal terrestrial radio access, E-UTRA), this access mode is referred to as evolved universal terrestrial radio access new radio dual connectivity (E-UTRA NR dual connectivity, EN-DC). In the EN-DC mode, the LTE network device is a master network device, and the NR network device is a secondary network device. Certainly, with evolution of the system, new radio evolved universal terrestrial radio access dual connectivity (NR E-UTRA dual connectivity, NE-DC) can also be supported in the future, that is, the NR network device is a master network device, and the LTE network device is a secondary network device. Because a terminal device in the EN-DC mode and a terminal device in the NE-DC mode each access two network devices using different radio access technologies, these DC modes may also be collectively referred to as an MR-DC mode.

(4) A subcarrier spacing is a value of a spacing between center positions or peak positions of two adjacent subcarriers in frequency domain in an OFDM system. For example, a subcarrier spacing in the LTE system is 15 kHz, and a subcarrier spacing in the 5G NR system may be 15 kHz, 30 kHz, 60 kHz, 120 kHz, or the like.

(5) Slot (slot): One slot in the NR system includes 14 OFDM symbols. For example, a slot length corresponding to a 15 kHz subcarrier spacing is 1 ms, and a slot length corresponding to a 30 kHz subcarrier spacing is 0.5 ms.

(6) The terms "system" and "network" in the embodiments of this application may be used interchangeably. "At least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" usually indicates an "or" relationship between associated objects. The term "at least one of the following items (pieces)" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first data packet and a second data packet are merely used to distinguish between different data packets, but do not indicate a difference in content, priorities, sending orders, importance degrees, or the like of the two data packets.

The foregoing describes some noun concepts in the embodiments of this application. The following describes technical features in the embodiments of this application.

For a wireless communication system operating in a TDD mode, a downlink carrier and an uplink carrier of the system are carriers at a same carrier frequency. In an NR technology in a 5G system, an uplink and downlink decoupling technology may be used. That is, a network device may perform uplink and downlink communication by using not only a TDD carrier (which may also be referred to as an unpaired carrier) at a frequency of F1 but also an additional uplink carrier. The additional uplink carrier is usually referred to as an SUL carrier, and a carrier frequency F2 of the SUL carrier is less than F1. In other words, an NR network device/NR terminal device may perform uplink communication on two uplink carriers, and the two uplink carriers correspond to one downlink carrier. Refer to FIG. 1. A typical scenario is: An NR TDD carrier frequency is in a 3.5 GHz frequency band, and an SUL carrier frequency is in a 1.8 GHz frequency band. In FIG. 1, slots marked D are downlink slots, and slots marked U are uplink slots. In addition, in the example in FIG. 1, a subcarrier spacing on an NR TDD carrier is greater than a subcarrier spacing on an SUL carrier. Therefore, a length of a first slot on the NR TDD carrier is less than a length of a second slot on the SUL carrier. Usually, the subcarrier spacing on the NR TDD carrier is 30 kHz, and the subcarrier spacing on the SUL carrier is 15 kHz. Therefore, the time length of the first slot on the NR TDD carrier is half the time length of the second slot on the SUL carrier. It should be noted that, the SUL carrier may be a carrier independently used by an NR system, or may be an uplink carrier shared by an NR system and an LTE system.

Only two transmit antennas are usually configured for a terminal device that is in the MR-DC mode and that supports the SUL carrier, where one transmit antenna is allocated to a 3.5 GHz frequency, and the other transmit antenna can be shared by a 1.8 GHz frequency and the 3.5 GHz frequency in a time division manner. In this way, the terminal device can use two antennas for sending at the 3.5 GHz frequency. Compared with using only one antenna for sending, using two antennas for sending can improve an uplink rate and capacity.

Considering that one antenna of the terminal device is shared by the 1.8 GHz frequency and the 3.5 GHz frequency, and only one operating frequency can be set for one antenna in a period of time, the terminal device needs to switch between two frequencies. When the terminal device switches the antenna between two frequencies, for example, the terminal device switches from the 3.5 GHz TDD carrier to the 1.8 GHz SUL carrier, the terminal device requires a specific switching time period to adjust the operating frequency of the antenna from 3.5 GHz to 1.8 GHz. This process usually takes 20 microseconds.

Figure 2:
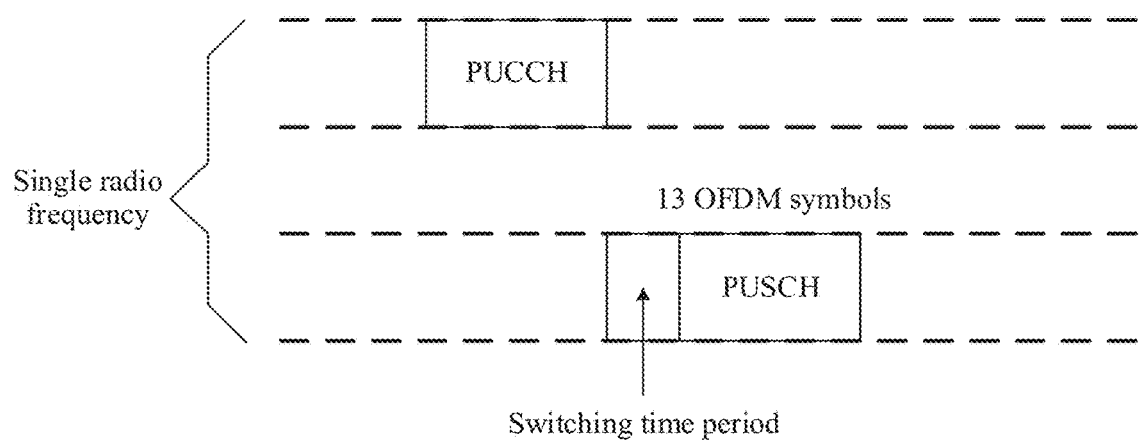
FIG. 2 is a schematic diagram of switching an operating frequency by a terminal device.

Currently, an operating frequency of an antenna of a terminal device depends on implementation of the terminal device, and a network device does not learn of the operating frequency of the antenna of the terminal device. In this case, when the antenna of the terminal device is at a specific operating frequency, the network device may indicate the terminal device to send an uplink signal at another frequency, and the terminal device needs to switch the operating frequency of the antenna. Because the terminal device requires a specific switching time period to switch the operating frequency of the antenna, when switching between two frequencies, the terminal device usually discards a signal carried on the last symbol of a carrier ahead, or discards a signal carried on the first symbol of a carrier behind. In this way, the terminal device may complete adjustment of an operating frequency of a radio frequency loop in a time period occupied by the symbol on which the signal is discarded. Refer to FIG. 2. For example, a terminal device needs to switch from a frequency for sending a physical uplink control channel (physical uplink control channel, PUCCH) to another frequency, to send a physical uplink shared channel (physical uplink shared channel, PUSCH). In this case, the terminal device uses, as a switching time period, a time period occupied by the first symbol of a slot occupied by the PUSCH.

It can be learned that, in a current frequency switching solution, the terminal device usually needs to discard a corresponding signal to perform switching; and because the network device does not learn of the operating frequency of the antenna of the terminal device, the network device does not learn that the terminal device has discarded a part of a signal. This may cause a problem in subsequent configuration or scheduling performed by the network device on the terminal device. In addition, because the network device cannot learn of the operating frequency of the antenna of the terminal device, the terminal device may discard the part of the signal when the network device schedules the terminal device. It is clear that this scheduling manner is unreasonable.

In view of this, the technical solutions in the embodiments of this application are provided. In the embodiments of this application, a terminal device may set an operating frequency of the terminal device based on a first frequency indicated by a network device. In this way, the network device can learn of the operating frequency of the terminal device; and when scheduling the terminal device, the network device can determine whether to indicate the terminal device to switch the operating frequency. According to this method, the network device can learn of a current operating frequency of the terminal device, to better schedule the terminal device.

Figure 3:
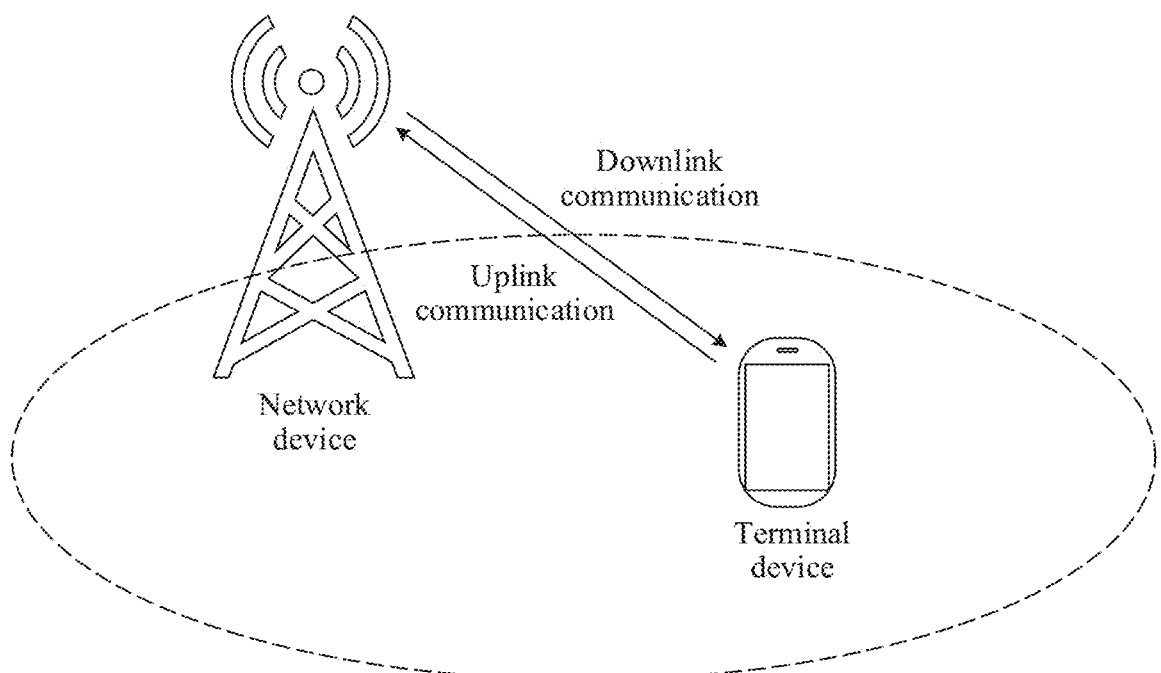
FIG. 3 is a schematic diagram of a first application scenario according to an embodiment of this application.
Figure 4:
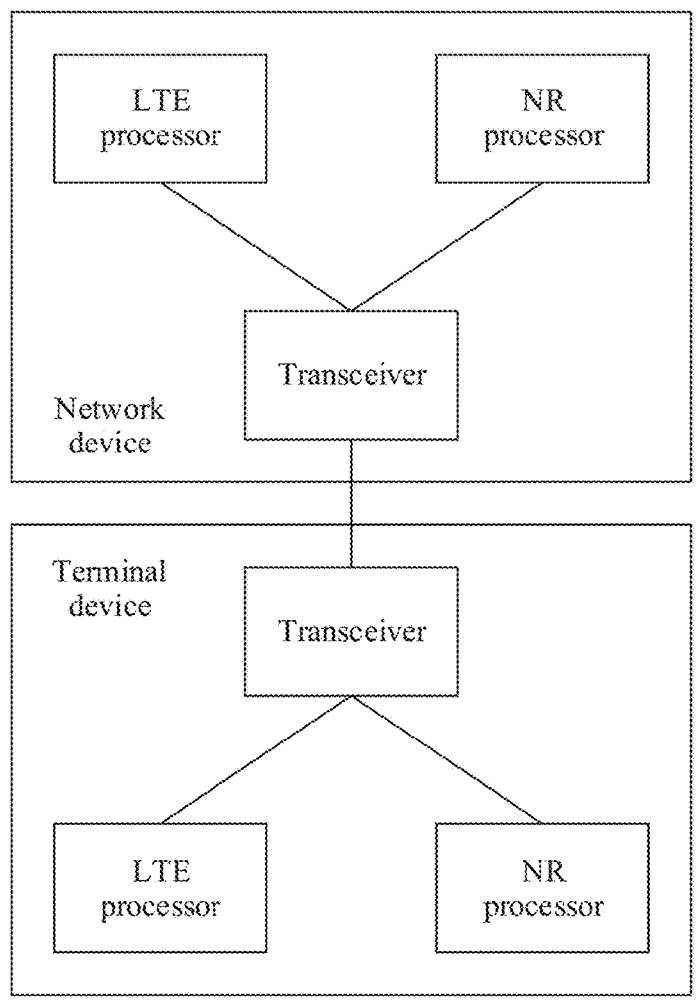
FIG. 4 is a schematic diagram of a second application scenario according to an embodiment of this application.
Figure 5:
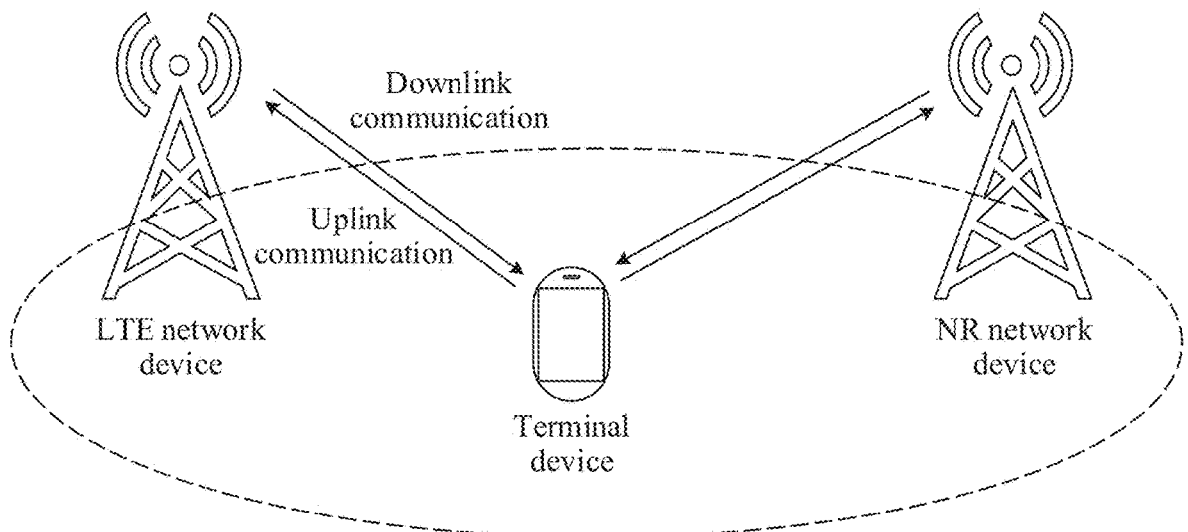
FIG. 5 is a schematic diagram of a third application scenario according to an embodiment of this application.
Figure 6:
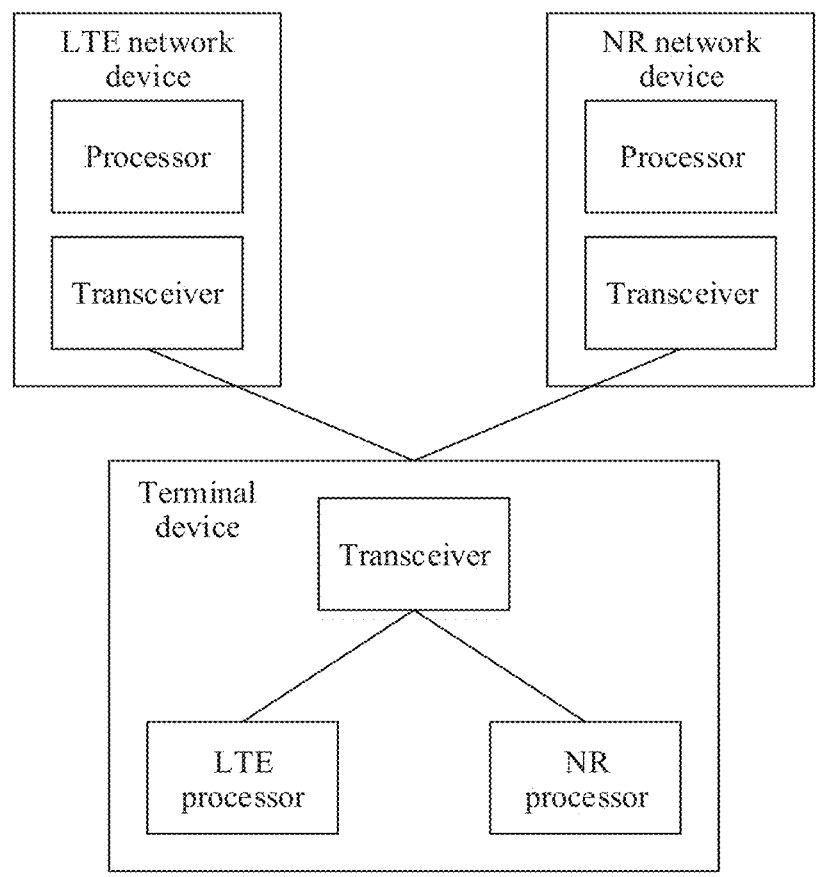
FIG. 6 is a schematic diagram of a fourth application scenario according to an embodiment of this application.

In an application scenario of the embodiments of this application, a terminal device operates in an LTE-NR dual connectivity mode, where the terminal device simultaneously accesses an LTE network device and an NR network device. It should be noted that the LTE network device and the NR network device may be deployed at a same site, as shown in FIG. 3 and FIG. 4. FIG. 3 is a schematic diagram of hardware structures of a network device and a terminal device. Alternatively, the LTE network device and the NR network device may be deployed at different sites, as shown in FIG. 5 and FIG. 6. FIG. 5 is a schematic diagram of hardware structures of a network device and a terminal device. In addition, when the LTE network device and the NR network device are deployed at the same site, the LTE network device and the NR network device may share a same set of hardware devices. FIG. 4 is a schematic diagram showing that an LTE network device and an NR network device share a part of hardware devices. In FIG. 4, the LTE network device and the NR network device may share a transceiver. Alternatively, when the LTE network device and the NR network device are deployed at the same site, the LTE network device and the NR network device may use different hardware devices.

The following describes, with reference to the accompanying drawings, the technical solutions provided in the embodiments of this application. In the embodiments of this application, for example, two or more transmit antennas are configured for a terminal device, where one of the transmit antennas needs to be shared by two or more frequencies. For example, two transmit antennas are configured for the terminal device, where one transmit antenna is allocated to a 3.5 GHz frequency, and the other transmit antenna can be shared by a 1.8 GHz frequency and the 3.5 GHz frequency in a time division manner. In this case, the transmit antenna that needs to be shared by the frequencies may operate on at least two uplink carriers, but can operate on only one of the at least two uplink carriers at one moment.

It should be noted that the operating frequency in the embodiments of this application may be understood as an operating frequency of the terminal device, and the operating frequency may be an operating frequency of the transmit antenna of the terminal device, or may be an operating frequency of a radio frequency link of the terminal device. In general, the operating frequency may be a frequency related to signal sending by the terminal device, and is referred to as, for example, a Tx frequency.

The operating frequency in the embodiments of this application may alternatively be understood as a frequency range, in other words, the terminal device may operate in the frequency range. The frequency range may correspond to a frequency band defined in a protocol, a frequency range occupied by a carrier bandwidth, or an operating frequency of a bandwidth part in a carrier. For example, the frequency range corresponds to a carrier bandwidth. The frequency range may be equal to a frequency range occupied by the carrier bandwidth, or may be greater than the frequency range occupied by the carrier bandwidth. This is not limited herein.

In the embodiments of this application, an example in which a corresponding method is performed by a terminal device is used. Therefore, "operating frequency" is described as "operating frequency of the terminal device" below. If the method is performed by another device, for example, by a chip system, the operating frequency should be an operating frequency of the chip system. In short, an object corresponding to the operating frequency changes with an execution body.

Figure 7:
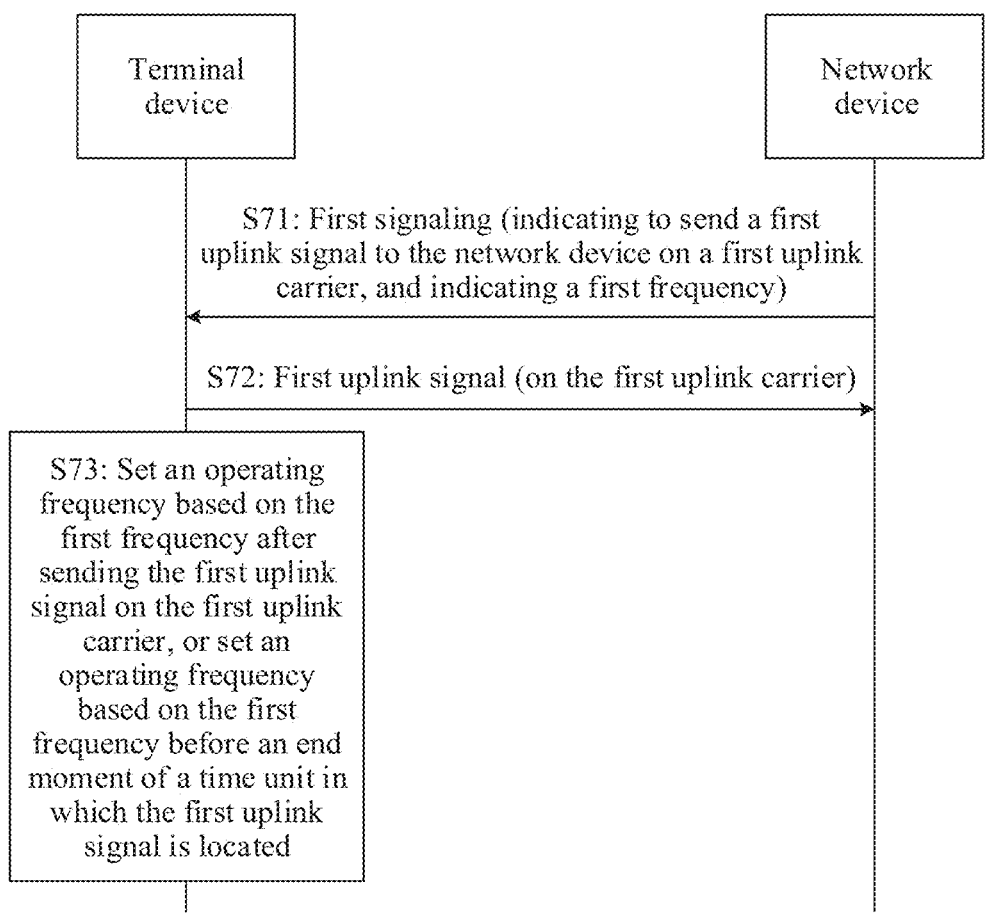
FIG. 7 is a flowchart of a first communication method according to an embodiment of this application.

An embodiment of this application provides a first communication method. FIG. 7 is a flowchart of the method. An example in which the method is applied to the network architecture shown in any one of FIG. 3 to FIG. 6 is used in the following description process. In addition, the method may be performed by two communication apparatuses. The two communication apparatuses are, for example, a first communication apparatus and a second communication apparatus. The first communication apparatus may be a network device or a communication apparatus that can support the network device in implementing functions required by the method, or may be a terminal device or a communication apparatus that can support the terminal device in implementing functions required by the method. Certainly, the first communication apparatus may alternatively be another communication apparatus, for example, a chip system. The second communication apparatus may be a network device or a communication apparatus that can support the network device in implementing functions required by the method, or may be a terminal device or a communication apparatus that can support the terminal device in implementing functions required by the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus is a terminal device; both the first communication apparatus and the second communication apparatus are network devices; both the first communication apparatus and the second communication apparatus are terminal devices; or the first communication apparatus is a network device, and the second communication apparatus is a chip system that can support a terminal device in implementing functions required by the method. For example, the network device is a base station.

For ease of description, the following uses an example in which the method is performed by a network device and a terminal device, namely, an example in which the first communication apparatus is a terminal device and the second communication apparatus is a network device. If this embodiment of this application is applied to the network architecture shown in any one of FIG. 3 to FIG. 6, the terminal device described below may be the terminal device in the network architecture shown in any one of FIG. 3 to FIG. 6. In addition, the network device described below may be the LTE network device or the NR network device in the network architecture shown in any one of FIG. 3 to FIG. 6.

S71: The network device sends first signaling to the terminal device, and the terminal device receives the first signaling from the network device, where the first signaling indicates to send a first uplink signal to the network device on a first uplink carrier, and the first signaling further indicates a first frequency.

In this embodiment of this application, for example, two or more transmit antennas are configured for the terminal device, where one of the transmit antennas may operate on at least two uplink carriers, but can operate on only one of the at least two uplink carriers at one moment. The at least two uplink carriers include the first uplink carrier, and the first uplink carrier is, for example, a common uplink carrier or an SUL carrier. The at least two uplink carriers may include one NR uplink carrier and one LTE uplink carrier, or include uplink carriers in two different cells. This is not specifically limited.

The first signaling is, for example, downlink control information (downlink control information, DCI), or may be information of another type, for example, higher layer signaling. The higher layer signaling is, for example, radio resource control (radio resource control, RRC) signaling or media access control (media access control, MAC) layer signaling.

Using an example in which the first signaling is the DCI, the DCI is originally used to schedule the terminal device to send an uplink signal to the network device on the first uplink carrier. For example, the uplink signal scheduled by using the DCI is referred to as the first uplink signal. For example, the first uplink signal may be one of a PUSCH, a PUCCH, a physical random access channel (physical random access channel, PRACH), or a sounding reference signal (sounding reference signal, SRS).

In an optional manner, in addition to scheduling the first uplink signal, the first signaling may further indicate the terminal device to set an operating frequency in a first manner. This means that the network device may indicate, to the terminal device, a manner of setting the operating frequency, so that the terminal device can perform setting based on the indication from the network device. In this way, the network device can learn of the operating frequency of the terminal device, to schedule the terminal device relatively properly. In addition, the first signaling may further indicate the first frequency. That the terminal device needs to set the operating frequency of the terminal device based on the first frequency may be understood as that the first frequency is a target frequency to which the terminal device needs to set the operating frequency, in other words, after the terminal device sets the operating frequency, the operating frequency of the terminal device needs to be the first frequency. Alternatively, this may be described as that the terminal device needs to set the operating frequency based on the first frequency, or described as that the terminal device needs to set the first frequency as the operating frequency. For example, the terminal device sets the operating frequency in the first manner based on the first frequency.

Setting the operating frequency by the terminal device based on the first frequency may be setting the operating frequency to the first frequency. Before the terminal device sets the operating frequency to the first frequency, the operating frequency of the terminal device may be the first frequency, or may be another frequency, for example, a second frequency. For example, if the first frequency is a frequency corresponding to the first uplink carrier, before the terminal device sets the operating frequency in the first manner, the operating frequency of the terminal device is the first frequency. In this case, setting the operating frequency by the terminal device may be considered as maintaining the operating frequency of the terminal device by the terminal device at the first frequency. Alternatively, if the first frequency is not a frequency corresponding to the first uplink carrier, but is a frequency corresponding to a second uplink carrier supported by the terminal device, before the terminal device sets the operating frequency in the first manner, the operating frequency of the terminal device is not the first frequency. In this case, setting the operating frequency by the terminal device may be considered as switching the operating frequency of the terminal device by the terminal device from the another frequency to the first frequency.

The first manner may include a first sub-manner, a second sub-manner, or a third sub-manner, or may include another sub-manner. The following separately describes the first sub-manner, the second sub-manner, and the third sub-manner.

1. First sub-manner: Set the operating frequency of the terminal device after sending the first uplink signal on the first uplink carrier. In this case, further considering the first frequency indicated by the first signaling, the terminal device sets the operating frequency of the terminal device based on the first frequency.

In the first sub-manner, the first signaling indicates the terminal device to set the operating frequency of the terminal device after sending the first uplink signal. That the terminal device may set the operating frequency of the terminal device after sending the first uplink signal may be understood as that the terminal device may set the operating frequency of the terminal device after completing sending of the first uplink signal. For example, if the first signaling is used to schedule the terminal device to send the first uplink signal on 14 orthogonal frequency division multiplexing (orthogonal frequency division multiplexing, OFDM) symbols of a slot (slot), the terminal device may set the operating frequency of the terminal device after completing sending of the first uplink signal, for example, on one or more OFDM symbols of a next slot of the slot. For example, the terminal device may set the operating frequency of the terminal device in a time period occupied by the first OFDM symbol of the next slot. Alternatively, for example, if the first signaling is used to schedule the terminal device to send the first uplink signal on the first 12 OFDM symbols of a slot, the terminal device may set the operating frequency of the terminal device after completing sending of the first uplink signal, for example, on the thirteenth OFDM symbol and/or the fourteenth OFDM symbol of the slot. A quantity of OFDM symbols that need to be occupied by the terminal device to set the operating frequency is not limited in this embodiment of this application.

For example, the antenna of the terminal device may operate on the first uplink carrier corresponding to a frequency of 3.5 GHz and the second uplink carrier corresponding to a frequency of 1.8 GHz, and the network device schedules, by using the first signaling, the terminal device to send the first uplink signal to the network device on the first uplink carrier, where the first signaling indicates that the terminal device needs to set the operating frequency based on the first frequency after completing sending of the first uplink signal, and the first signaling further indicates the first frequency. Based on the indication by the first signaling, the terminal device may set the operating frequency of the terminal device based on the first frequency after completing sending of the first uplink signal. For example, if the first frequency is 3.5 GHz, it means that the operating frequency of the terminal device does not change, and that the terminal device sets the operating frequency of the terminal device based on the first frequency may be understood as that the terminal device continues to maintain the operating frequency of the terminal device at 3.5 GHz. Alternatively, for example, if the first frequency is 1.8 GHz, it means that the operating frequency of the terminal device needs to change, and that the terminal device sets the operating frequency of the terminal device based on the first frequency may be understood as that the terminal device switches the operating frequency of the terminal device from 3.5 GHz to 1.8 GHz.

The operating frequency of the terminal device is set after the first uplink signal is sent, so that sending of the first uplink signal is not affected when the terminal device sets the operating frequency. This avoids discarding the first uplink signal, and ensures as much as possible that the first uplink signal can be normally sent.

2. Second sub-manner. Set the operating frequency of the terminal device before completing sending of the first uplink signal. In this case, further considering the first frequency indicated by the first signaling, the terminal device sets the operating frequency of the terminal device based on the first frequency.

For example, if the first signaling is used to schedule the terminal device to send the first uplink signal in a first time period, the first signaling may alternatively indicate to set the operating frequency of the terminal device based on the first frequency before an end moment of the first time period arrives, or the first signaling may indicate to set the operating frequency of the terminal device based on the first frequency before the first time period ends.

In the second sub-manner, the network device indicates the terminal device to set the operating frequency of the terminal device before the first time period ends, and the first uplink signal needs to be sent on the first uplink carrier. In other words, the first uplink signal needs to be sent at an operating frequency used before setting. Therefore, the terminal device cannot set the operating frequency of the terminal device before starting sending the first uplink signal. If the terminal device sets the operating frequency of the terminal device before starting sending the first uplink signal, the first uplink signal cannot be sent. In this case, the terminal device may choose to set the operating frequency of the terminal device when sending of the first uplink signal is about to be completed (in other words, when the first time period is about to end). A time difference between a moment at which the terminal device starts setting the operating frequency and the end moment of the first time period may be related to a time period specified to set the operating frequency by the terminal device, for example, is greater than or equal to the time period specified to set the operating frequency by the terminal device, so that the terminal device can complete setting of the operating frequency by the end of the first time period.

For example, if the first signaling is used to schedule the terminal device to send the first uplink signal on 14 OFDM symbols of a slot, the terminal device may set the operating frequency of the terminal device before completing sending of the first uplink signal. For example, the terminal device sets the operating frequency of the terminal device on the last OFDM symbol of the slot. In this case, the terminal device may need to discard an entire signal or a part of the signal carried on the last OFDM symbol of the slot. Specifically, whether to discard the entire signal or the part of the signal carried on the last OFDM symbol of the slot depends on a time period required by the terminal device to complete setting of the operating frequency. The signal carried on the last OFDM symbol of the slot is a part of the first uplink signal. In other words, the terminal device needs to discard a part of the uplink signal to complete setting of the operating frequency. However, in this case, because the network device indicates the terminal device to set the operating frequency of the terminal device before completing sending of the first uplink signal, and the first uplink signal is also scheduled by the network device, the network device can learn that the terminal device discards the part of the first uplink signal. Therefore, the network device may have a corresponding policy to cope with, and can complete tasks such as relatively proper configuration of the terminal device.

For example, the antenna of the terminal device may operate on the first uplink carrier corresponding to a frequency of 3.5 GHz and the second uplink carrier corresponding to a frequency of 1.8 GHz, and the network device schedules, by using the first signaling, the terminal device to send the first uplink signal to the network device on the first uplink carrier in the first time period, where the first signaling indicates that the terminal device needs to set the operating frequency based on the first frequency before the first time period ends, and the first signaling further indicates the first frequency. Based on the indication by the first signaling, the terminal device may set the operating frequency of the terminal device based on the first frequency before the first time period ends. For example, if the first frequency is 3.5 GHz, it means that the operating frequency of the terminal device does not change, and that the terminal device sets the operating frequency of the terminal device based on the first frequency may be understood as that the terminal device continues to maintain the operating frequency of the terminal device at 3.5 GHz. Alternatively, for example, if the first frequency is 1.8 GHz, it means that the operating frequency of the terminal device needs to change, and that the terminal device sets the operating frequency of the terminal device based on the first frequency may be understood as that the terminal device switches the operating frequency of the terminal device from 3.5 GHz to 1.8 GHz.

The operating frequency of the terminal device is set before sending of the first uplink signal is completed, so that the terminal device can operate, as soon as possible, at an operating frequency obtained through the setting. The network device can learn of discarding of the part of the first uplink signal, and therefore can make a corresponding decision.

3. Third sub-manner: Set the operating frequency of the terminal device before an end moment of a time unit in which the first uplink signal is located arrives. In this case, further considering the first frequency indicated by the first signaling, the terminal device sets the operating frequency of the terminal device based on the first frequency. A time difference between a moment at which the terminal device starts setting the operating frequency and the end moment of the time unit in which the first uplink signal is located may be related to a time period specified to set the operating frequency by the terminal device, for example, is greater than or equal to the time period specified to set the operating frequency by the terminal device, so that the terminal device can complete setting of the operating frequency by the end of the time unit in which the first uplink signal is located.

In the third sub-manner, the network device indicates the terminal device to set the operating frequency of the terminal device before the end moment of the time unit in which the first uplink signal is located arrives, and the first uplink signal needs to be sent on the first uplink carrier. In other words, the first uplink signal needs to be sent at an operating frequency used before setting. Therefore, the terminal device cannot set the operating frequency of the terminal device before starting sending the first uplink signal. If the terminal device sets the operating frequency of the terminal device before starting sending the first uplink signal, the first uplink signal cannot be sent. For example, the time unit is a slot. In this case, if the first uplink signal needs to be sent on the last symbol included in the time unit in which the first uplink signal is located, the terminal device may choose to set the operating frequency of the terminal device when sending of the first uplink signal is about to be completed; or if the first uplink signal does not need to be sent on the last symbol included in the time unit in which the first uplink signal is located, the terminal device may choose to set the operating frequency of the terminal device after sending of the first uplink signal is completed.

For example, the first signaling is used to schedule the terminal device to send the first uplink signal on 14 OFDM symbols of a slot, and the terminal device needs to set the operating frequency of the terminal device before the end moment of the time unit in which the first uplink signal is located arrives. In this case, the terminal device may set the operating frequency of the terminal device before completing sending of the first uplink signal. For example, the terminal device sets the operating frequency of the terminal device on the last OFDM symbol of the slot. In this case, the terminal device may need to discard an entire signal or a part of the signal carried on the last OFDM symbol of the slot. Specifically, whether to discard the entire signal or the part of the signal carried on the last OFDM symbol of the slot depends on a time period required by the terminal device to complete setting of the operating frequency. The signal carried on the last OFDM symbol of the slot is a part of the first uplink signal. In other words, the terminal device needs to discard a part of the uplink signal to complete setting of the operating frequency. However, in this case, because the network device indicates the terminal device to set the operating frequency of the terminal device before the end moment of the time unit in which the first uplink signal is located arrives, and the first uplink signal is also scheduled by the network device, the network device can learn that the terminal device discards the part of the first uplink signal. Therefore, the network device may have a corresponding policy to cope with, and can complete tasks such as relatively proper configuration of the terminal device.

For another example, the first signaling is used to schedule the terminal device to send the first uplink signal on the first 12 OFDM symbols of a slot, and the terminal device needs to set the operating frequency of the terminal device before the end moment of the time unit in which the first uplink signal is located arrives. In this case, the terminal device may set the operating frequency of the terminal device after completing sending of the first uplink signal. For example, the terminal device may set the operating frequency of the terminal device on the thirteenth OFDM symbol and/or the fourteenth OFDM symbol of the slot. In this case, the terminal device does not need to discard the first uplink signal, so that the first uplink signal is sent as completely as possible; and it can be ensured that setting of the operating frequency is as timely as possible.

Which of the foregoing sub-manners is included in the first manner may be configured by the network device, or may be stipulated in a protocol. If the first manner is configured by the network device, the network device may indicate the first manner to the terminal device. For example, the first signaling further indicates the terminal device to set the operating frequency of the terminal device in the first manner. Alternatively, if the first manner is stipulated in the protocol, the network device may not need to give an indication, and the terminal device may set the operating frequency of the terminal device in the first manner stipulated in the protocol after receiving the first signaling from the network device. Certainly, the first frequency based on which the setting is performed is still indicated by the first signaling. In this case, it may be considered that the first frequency is used to set the operating frequency by the terminal device based on the first frequency after the terminal device sends the first uplink signal on the first uplink carrier, is used to set the operating frequency by the terminal device based on the first frequency before the end moment of the time unit in which the first uplink signal is located, or is used to set the operating frequency by the terminal device based on the first frequency before the end moment of the first time period arrives.

It should be noted that, in the first sub-manner, it may be understood that the first signaling indicates the terminal device to set the operating frequency of the terminal device after a first moment. In the first sub-manner, the first moment is an end moment of sending the first uplink signal, or the first moment may be another moment, for example, a moment after an end moment of sending the first uplink signal. Alternatively, another moment, for example, an end moment at which the terminal device receives the first signaling or receives a signal carrying the first signaling, may be used as a reference for the first moment, that is, the first signaling indicates the terminal device to set the operating frequency of the terminal device after the end moment of receiving the signal carrying the first signaling plus preset duration, where the preset duration may be configured by the network device, or may be stipulated in a protocol. Similarly, in the second sub-manner or the third sub-manner, it may be understood that the first signaling indicates the terminal device to complete setting of the operating frequency of the terminal device before a second moment. The second moment is not limited to specific implementations in the second sub-manner and the third sub-manner, and may alternatively be another moment, for example, a moment after an end moment of sending the first uplink signal. In addition, another moment, for example, an end moment at which the terminal device receives the first signaling or receives a signal carrying the first signaling, may be used as a reference for the second moment, that is, the first signaling indicates the terminal device to complete setting of the operating frequency of the terminal device before the end moment of receiving the signal carrying the first signaling plus preset duration.

For example, the first signaling may include indication information, and the indication information may be used to indicate the terminal device to set the operating frequency in the first manner. For example, the indication information occupies one bit (bit). If a value of the bit is "0", it indicates not to set the operating frequency of the antenna. This means that a current operating frequency of the antenna is to be maintained, in other words, the operating frequency of the antenna is not to be changed. If a value of the bit is "1", it indicates to set the operating frequency of the antenna. This means that the operating frequency of the antenna is to be set to another frequency. In this case, if the value of the bit is "1", the first signaling may additionally indicate the first frequency, and the first signaling may further include one or more additional bits to indicate the first frequency.

Alternatively, if the first signaling includes the indication information, it indicates to set the operating frequency of the antenna; or if the first signaling does not include the indication information, it indicates not to set the operating frequency of the antenna. In this case, the indication information may be any value. In this case, if a value of the bit is "1", the first signaling may additionally indicate the first frequency, and the first signaling may further include one or more additional bits to indicate the first frequency.

Alternatively, if an antenna that is of the terminal device and that is shared by frequencies may operate on two uplink carriers, where one of the uplink carriers is a high frequency carrier, and the other of the uplink carriers is a low frequency carrier, and if a value of the bit is "0", it indicates to set the operating frequency of the terminal device to a frequency corresponding to the high frequency carrier, and this means to implicitly indicate that the first frequency is the frequency corresponding to the high frequency carrier; or if a value of the bit is "1, it indicates to set the operating frequency of the terminal device to a frequency corresponding to the low frequency carrier, and this means to implicitly indicate that the first frequency is the frequency corresponding to the low frequency carrier. Certainly, "high frequency" and "low frequency" herein are merely relative to each other. For example, if the antenna of the terminal device can operate on a 1.8 GHz uplink carrier and a 3.5 GHz uplink carrier, 1.8 GHz is a low frequency relative to 3.5 GHz, and 3.5 GHz is a high frequency relative to 1.8 GHz. In this case, the first signaling does not need to indicate the first frequency by using another bit.

It should be noted that the indication information herein may be explicitly included in the first signaling, or may be implicitly included in the first signaling, for example, may be implicitly included in another field of the first signaling. In a possible implementation, the indication information is implicitly included in a first field that is included in the first signaling and that indicates a time resource occupied by the first uplink signal, and the first field indicates a start symbol location and a length of symbols occupied by the first uplink signal, and further indicates the terminal device to set the operating frequency in the first manner. When the first field has Y optional states, X states correspond to setting the operating frequency of the antenna, and Y-X states correspond to not setting the operating frequency of the antenna, where Y is a positive integer greater than 1, and X is a positive integer greater than or equal to 1 and less than Y. Specifically, when the first field indicates that the symbols occupied by the first uplink signal do not include last K symbols of a slot in which the first uplink signal is located, the first field indicates the terminal device to set the operating frequency of the antenna; or when the first field indicates that the symbols occupied by the first uplink signal include at least one of last K symbols of a slot in which the first uplink signal is located, the first field indicates the terminal device not to set the operating frequency of the antenna.

In another possible implementation, the indication information is carried in a scrambling code of the first signaling, for example, is carried in a scrambling code of a downlink signal carrying the first signaling. Using a first scrambling code for scrambling corresponds to setting the operating frequency of the antenna, and using a second scrambling code for scrambling corresponds to not setting the operating frequency of the antenna. A specific manner in which the indication information is carried in the first signaling is not limited herein.

S72: The terminal device sends the first uplink signal to the network device on the first uplink carrier, and the network device receives the first uplink signal from the terminal device on the first uplink carrier. That is, the terminal device sends the first uplink signal to the network device on the first uplink carrier before setting the operating frequency based on the first frequency.

Because the first uplink signal needs to be sent at the operating frequency used before the setting, the terminal device first sends the first uplink signal to the network device.

S73: The terminal device sets the operating frequency based on the first frequency. FIG. 7 uses an example in which the terminal device sets the operating frequency based on the first frequency after sending the first uplink signal on the first uplink carrier, or sets the operating frequency based on the first frequency before the end moment of the time unit in which the first uplink signal is located.

After the terminal device sends the first uplink signal to the network device, the terminal device may set the operating frequency of the terminal device based on the first frequency. For example, the terminal device may set the operating frequency in the first manner based on the first frequency. For a specific first manner, refer to the description in S71.

The foregoing considers only a case in which the terminal device receives the first signaling. Alternatively, the network device may further send second signaling to the terminal device in addition to sending the first signaling to the terminal device, where the second signaling indicates to send a second uplink signal to the network device on the first uplink carrier. After receiving the second signaling from the network device, the terminal device may determine to send the second uplink signal to the network device on the first uplink carrier. The second uplink signal is located after the first uplink signal in terms of time, in other words, the first uplink signal is first sent, and then the second uplink signal is sent. In addition, the first uplink signal and the second uplink signal are in the same time unit. For example, a time period occupied by the first uplink signal does not overlap a time period occupied by the second uplink signal in the same time unit, and the time unit is, for example, a slot.

The second signaling is, for example, DCI, or may be information of another type, for example, higher layer signaling. The higher layer signaling is, for example, RRC signaling or MAC layer signaling. The second uplink signal is, for example, one of a PUSCH, a PUCCH, a PRACH, or an SRS.

The first signaling and the second signaling may be signaling of a same type, for example, are both DCI or higher layer signaling. When the first signaling and the second signaling are both higher layer signaling, the first signaling and the second signaling may be both RRC signaling or MAC layer signaling; or one of the first signaling and the second signaling may be RRC signaling, and the other may be MAC layer signaling. Alternatively, the first signaling and the second signaling may be signaling of different types. For example, the first signaling is DCI, and the second signaling is higher layer signaling; or the first signaling is higher layer signaling, and the second signaling is DCI.

When two pieces of signaling are considered, different cases need to be distinguished.

In a first case, the second signaling does not indicate the terminal device to set the operating frequency. In other words, the first signaling indicates the terminal device to set the operating frequency, but the second signaling does not indicate the terminal device to set the operating frequency. In this case, the terminal device may set the operating frequency of the terminal device based on the indication by the first signaling. Both the first uplink signal and the second uplink signal need to be sent on the first uplink carrier, that is, need to be sent at the operating frequency used before the setting. Therefore, the terminal device may set the operating frequency of the terminal device based on the indication by the first signaling after sending the first uplink signal and the second uplink signal. However, the second uplink signal may be sent after sending of the first uplink signal is completed. Therefore, in this case, the network device may preferentially indicate the terminal device to set the operating frequency in the first sub-manner or the third sub-manner. If setting the operating frequency in the first sub-manner, the terminal device may set the operating frequency of the terminal device after completing sending of the first uplink signal and the second uplink signal. Alternatively, if setting the operating frequency in the third sub-manner, the terminal device may set the operating frequency of the terminal device before the end moment of the time unit in which the first uplink signal is located arrives. The first uplink signal and the second uplink signal are located in the same time unit. Therefore, the terminal device may set the operating frequency of the terminal device before the time unit ends. Regardless of whether the operating frequency of the terminal device is set in the first sub-manner or the third sub-manner, impact on the first uplink signal and the second uplink signal is reduced as much as possible.

However, if the network device indicates the terminal device to set the operating frequency in the second sub-manner, the terminal device needs to set the operating frequency before completing sending of the first uplink signal. The second uplink signal is located after the first uplink signal in terms of time, that is, the second uplink signal is sent after sending of the first uplink signal is completed. Therefore, if the operating frequency is set before sending of the first uplink signal is completed, the second uplink signal may fail to be sent. Therefore, to ensure that both the first uplink signal and the second uplink signal can be sent as normally as possible, the network device may indicate the terminal device to set the operating frequency in the first sub-manner or the third sub-manner.

In a second case, the second signaling also indicates the terminal device to set the operating frequency. For example, the second signaling indicates the terminal device to set the operating frequency in a second manner, and the second signaling may indicate a third frequency. If the terminal device sets the operating frequency based on the second signaling, the terminal device needs to set the operating frequency based on the third frequency. The third frequency and the first frequency may be a same frequency, or may be different frequencies. In this case, the first signaling indicates the terminal device to set the operating frequency, and the second signaling also indicates the terminal device to set the operating frequency. The second manner may also include one of the foregoing first sub-manner, second sub-manner, or third sub-manner. The first manner indicated by the first signaling and the second manner indicated by the second signaling may be a same manner, for example, are both the foregoing second sub-manner. Alternatively, the first manner indicated by the first signaling and the second manner indicated by the second signaling may be different manners. For example, the first manner indicated by the first signaling is the foregoing first sub-manner, and the second signaling indicates the foregoing third sub-manner.

In this case, the terminal device may set the operating frequency of the terminal device based on the indication by the second signaling. Because the second uplink signal is located after the first uplink signal in terms of time, the network device may first determine the first signaling and then determine the second signaling, and the second signaling may be more accurate than the first signaling. For example, the terminal device may set the operating frequency of the terminal device based on the indication by the second signaling after sending the first uplink signal and the second uplink signal. Certainly, if the second signaling indicates to set the operating frequency in the second sub-manner, the terminal device sets the operating frequency of the terminal device before completing sending of the second uplink signal, and "before completing sending of the second uplink signal" may also be understood as "after sending the second uplink signal".

Alternatively, in this case, the terminal device may preferentially consider the indication by the first signaling, that is, the terminal device sets the operating frequency of the terminal device based on the indication by the first signaling. For example, the terminal device sets the operating frequency of the terminal device based on the indication by the first signaling after sending the first uplink signal. For example, the operating frequency of the terminal device used before the setting is a frequency 1, the terminal device sets the operating frequency based on the indication by the first signaling after sending the first uplink signal at the frequency 1, and for example, the operating frequency obtained through the setting (namely, the first frequency) is a frequency 2. In this case, the terminal device operates at the frequency 2. If the terminal device can reset the operating frequency to the frequency 1 before a time domain resource of the second uplink signal arrives, the terminal device may continue to send the entire second uplink signal. Alternatively, if a part of a time domain resource of the second uplink signal has expired when the terminal device resets the operating frequency to the frequency 1, the terminal device may continue to send a part of the second uplink signal by using the other part of the time domain resource that is still valid. In this case, the terminal device discards a part of the second uplink signal. Alternatively, if a time domain resource of the second uplink signal has completely expired when the terminal device resets the operating frequency to the frequency 1, the terminal device cannot send the second uplink signal. In this case, the terminal device discards the entire second uplink signal.

For example, the first uplink signal is a PUSCH, and the second uplink signal is an SRS. For example, if the second uplink signal is an aperiodic SRS scheduled by using DCI, and both second DCI and first DCI indicate the terminal device to set the operating frequency, because the second uplink signal is scheduled by using the DCI, a priority or urgency of the second uplink signal may be higher, and the terminal device may ignore an indication by the first DCI, and set the operating frequency based on an indication by the second DCI. Alternatively, for example, if the first uplink signal is a PUSCH, and the second uplink signal is a periodic SRS or semi-persistent SRS that is configured by using higher layer signaling, the second uplink signal may have lower urgency or priority than the first uplink signal. Therefore, the terminal device may ensure normal sending of the first uplink signal as much as possible, and ensure a response to the first signaling as much as possible. For example, the terminal device may set the operating frequency based on the indication by the first signaling after sending the PUSCH.

In this embodiment of this application, the network device may indicate, by using the first signaling, the terminal device to set the operating frequency, and the terminal device may perform setting based on the indication from the network device. In other words, the network device can learn of the operating frequency of the terminal device. In this way, when scheduling the terminal device, the network device can determine whether to indicate the terminal device to switch the operating frequency. According to this method, the network device can learn of the current operating frequency of the terminal device, to better schedule the terminal device.

Figure 8:
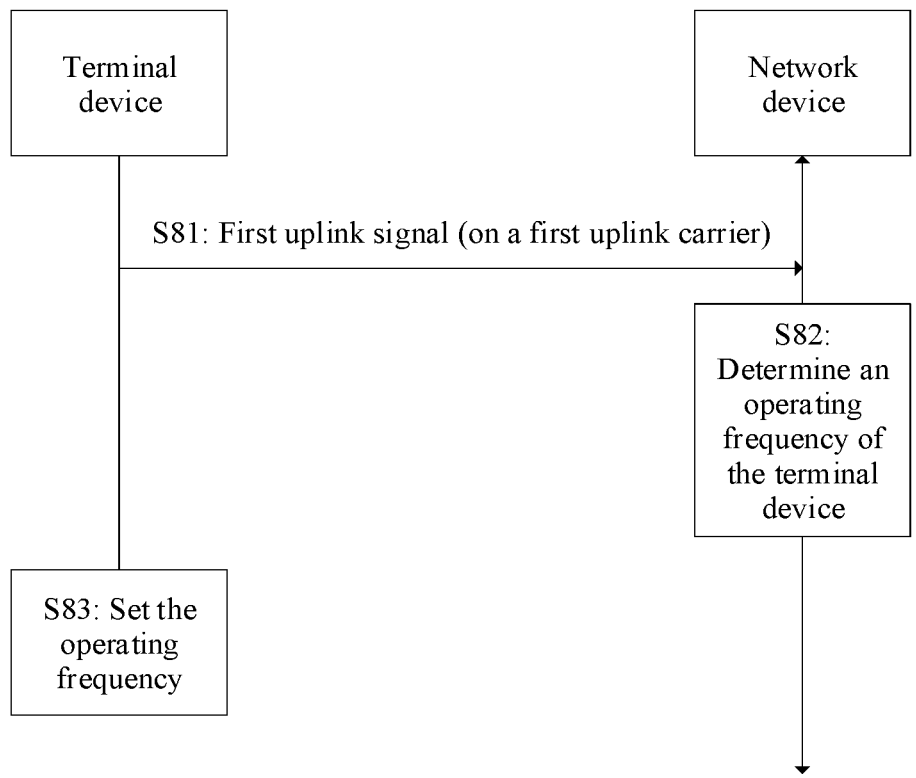
FIG. 8 is a flowchart of a second communication method according to an embodiment of this application.

To resolve a same technical problem, an embodiment of this application provides a second communication method. FIG. 8 is a flowchart of the method. An example in which the method is applied to the network architecture shown in any one of FIG. 3 to FIG. 6 is used in the following description process. In addition, the method may be performed by two communication apparatuses. The two communication apparatuses are, for example, a third communication apparatus and a fourth communication apparatus. The third communication apparatus may be a network device or a communication apparatus that can support the network device in implementing functions required by the method, or may be a terminal device or a communication apparatus that can support the terminal device in implementing functions required by the method. Certainly, the third communication apparatus may alternatively be another communication apparatus, for example, a chip system. The fourth communication apparatus may be a network device or a communication apparatus that can support the network device in implementing functions required by the method, or may be a terminal device or a communication apparatus that can support the terminal device in implementing functions required by the method. Certainly, the fourth communication apparatus may alternatively be another communication apparatus, for example, a chip system. In addition, implementations of the third communication apparatus and the fourth communication apparatus are not limited. For example, the third communication apparatus may be a network device, and the fourth communication apparatus is a terminal device; both the third communication apparatus and the fourth communication apparatus are network devices; both the third communication apparatus and the fourth communication apparatus are terminal devices; or the third communication apparatus is a network device, and the fourth communication apparatus is a chip system that can support a terminal device in implementing functions required by the method. For example, the network device is a base station.

For ease of description, the following uses an example in which the method is performed by a network device and a terminal device, namely, an example in which the third communication apparatus is a terminal device and the fourth communication apparatus is a network device. If this embodiment of this application is applied to the network architecture shown in any one of FIG. 3 to FIG. 6, the terminal device described below may be the terminal device in the network architecture shown in any one of FIG. 3 to FIG. 6. In addition, the network device described below may be the LTE network device or the NR network device in the network architecture shown in any one of FIG. 3 to FIG. 6.

S81: The terminal device sends a first uplink signal to the network device on a first uplink carrier, and the network device receives the first uplink signal from the terminal device on the first uplink carrier.

In this embodiment of this application, an antenna of the terminal device may operate on at least two uplink carriers, but can operate on only one of the at least two uplink carriers at one moment. The at least two uplink carriers include the first uplink carrier, and the first uplink carrier is, for example, a common uplink carrier or an SUL carrier. The at least two uplink carriers may include one NR uplink carrier and one LTE uplink carrier, or include uplink carriers in two different cells. This is not specifically limited.

S82: The network device determines an operating frequency of the terminal device. For example, the network device may directly determine the operating frequency of the terminal device, or may determine that the terminal device sets the operating frequency of the terminal device based on a first condition.

The first condition includes, for example, one of a first sub-condition, a second sub-condition, a third sub-condition, or a fourth sub-condition, or may include another sub-condition. The following describes the first sub-condition, the second sub-condition, the third sub-condition, and the fourth sub-condition.

1. First sub-condition: Before the terminal device sends an uplink signal to the network device on an uplink carrier other than the first uplink carrier, the operating frequency of the terminal device corresponds to the first uplink carrier, for example, is a second frequency.

This means that the operating frequency of the terminal device remains at the second frequency after the terminal device sends the first uplink signal to the network device on the first uplink carrier and before the terminal device further sends the uplink signal to the network device on the uplink carrier other than the first uplink carrier. For example, the terminal device sends the first uplink signal to the network device on the first uplink carrier at a first moment, sends the first uplink signal to the network device on a second uplink carrier at a second moment after the first moment, and does not send the uplink signal to the network device on the uplink carrier other than the first uplink carrier in a time period between the first moment and the second moment. In this case, the operating frequency of the terminal device corresponds to the first uplink carrier before the second moment. In addition, in the time period between the first moment and the second moment, the terminal device may send or may not send an uplink signal other than the foregoing uplink signal to the network device on the first uplink carrier. This is not limited.

That the terminal device sets the operating frequency of the terminal device based on the first sub-condition may also be understood as that the terminal device maintains a correspondence between the operating frequency of the terminal device and the first uplink carrier based on the first sub-condition.

2. Second sub-condition: If the terminal device sends no uplink signal to the network device within first duration after the terminal device sends the first uplink signal, the operating frequency of the terminal device corresponds to the first uplink carrier within the first duration.

For example, the terminal device may start timing after sending the first uplink signal (for example, when completing sending of the first uplink signal). If the terminal device has not sent any uplink signal to the network device when the first duration expires, the operating frequency of the terminal device corresponds to the first uplink carrier within the first duration. The operating frequency of the terminal device is not limited after the first duration. For example, the terminal device may determine, based on a situation, whether to switch the operating frequency of the terminal device, and the network device may perform no control. For example, the terminal device may perform timing by using a timer or in another manner. The first duration may be configured by the network device, or may be stipulated in a protocol.

In another case, the terminal device starts timing after completing sending of the first uplink signal, and it is likely that the terminal device further sends an uplink signal (for example, referred to as a second uplink signal) to the network device before the first duration expires. If this case occurs, the terminal device may resume timing the first duration after sending the second uplink signal (for example, when completing sending of the second uplink signal). If the terminal device has not sent any uplink signal to the network device when the first duration expires, the operating frequency of the terminal device corresponds to the first uplink carrier within the first duration. The rest may be deduced by analogy.

The second sub-condition is relatively applicable to a scenario in which the network device performs persistent scheduling on the terminal device on the first uplink carrier. For example, if the network device performs persistent scheduling on the terminal device, in the foregoing manner in which the terminal device cyclically times the first duration, the terminal device may remain in the first duration within a scheduling time period of the network device. In this case, the operating frequency of the terminal device always corresponds to the first uplink carrier. In this way, the terminal device does not need to perform frequency switching in a scheduling process performed by the network device, so that power consumption of the terminal device is reduced, and a scheduling delay is also reduced.

That the terminal device sets the operating frequency of the terminal device based on the second sub-condition may also be understood as that the terminal device maintains a correspondence between the operating frequency of the terminal device and the first uplink carrier based on the second sub-condition.

It should be noted that the second sub-condition may be understood as: If the terminal device sends no uplink signal to the network device within the first duration after a first moment, the operating frequency of the terminal device corresponds to the first uplink carrier within the first duration. In the second sub-condition, the first moment is an end moment at which the terminal device sends the first uplink signal. The first moment is not limited in this embodiment of this application. The first moment may alternatively be another moment, for example, a start moment at which the terminal device sends the first uplink signal, an end moment at which the terminal device receives first signaling used to indicate the terminal device to send the first uplink signal, an end moment of receiving a downlink signal used to carry first signaling indicating the terminal device to send the first uplink signal, or a moment after these end moments.

3. Third sub-condition: If the terminal device sends no uplink signal to the network device within second duration after the terminal device sends the first uplink signal, the operating frequency of the terminal device corresponds to a first frequency after the second duration.

The first frequency may be a predetermined frequency.

In an implementation of the predetermined frequency, the predetermined frequency may be indicated by the first signaling sent by the network device to the terminal device. For example, if the network device sends the first signaling to the terminal device, and the terminal device receives the first signaling from the network device, where the first signaling indicates the first frequency, the terminal device may determine the first frequency. For example, the first signaling is sent by the network device to the terminal device before S81. The first signaling is, for example, DCI, or may be information of another type, for example, higher layer signaling. The higher layer signaling is, for example, RRC signaling or MAC layer signaling.

For example, the first frequency may be determined based on a frequency corresponding to an uplink carrier on which a PUCCH is configured for the terminal device. For example, the first frequency is the frequency corresponding to the uplink carrier on which the PUCCH is configured for the terminal device. Alternatively, the first frequency may be a frequency corresponding to an uplink carrier supported by the terminal device other than an uplink carrier on which a PUCCH is configured.

In another implementation of the predetermined frequency, the predetermined frequency may be a predefined frequency. For example, the predetermined frequency is predefined in a protocol, or is preconfigured in the terminal device. For example, the predefined frequency may be a frequency corresponding to a low frequency carrier in the at least two uplink carriers, or may be a frequency corresponding to a high frequency carrier in the at least two uplink carriers. For another example, when the at least two uplink carriers include an SUL carrier and a common uplink carrier, the predefined frequency may be a frequency corresponding to the SUL carrier, or may be a frequency corresponding to the common uplink carrier. For still another example, when the at least two uplink carriers include the LTE uplink carrier and the NR uplink carrier, the predefined frequency may be a frequency corresponding to the NR uplink carrier, or may be a frequency corresponding to the LTE uplink carrier. For yet another example, when the at least two uplink carriers include an uplink carrier in a primary cell and an uplink carrier in a secondary cell, the predefined frequency may be a frequency corresponding to the uplink carrier in the primary cell.

How to determine the predetermined frequency is not specifically limited.

The first frequency may be a frequency corresponding to the first uplink carrier, or may be a frequency corresponding to an uplink carrier supported by the terminal device other than the first uplink carrier.

For example, the terminal device may start timing after sending the first uplink signal (for example, when completing sending of the first uplink signal). If the terminal device has not sent any uplink signal to the network device when the second duration expires, the operating frequency of the terminal device is the first frequency after the second duration. The frequency of the terminal device is not limited within the second duration. For example, the terminal device may determine, based on a situation, whether to switch the operating frequency of the terminal device, and the network device may perform no control. For example, the terminal device may perform timing by using a timer or in another manner. The second duration may be configured by the network device, or may be stipulated in a protocol.

In another case, the terminal device starts timing after completing sending of the first uplink signal, and it is likely that the terminal device further sends an uplink signal (for example, referred to as a third uplink signal) to the network device before the second duration expires. If this case occurs, the terminal device may resume timing the second duration after sending the third uplink signal (for example, when completing sending of the third uplink signal). If the terminal device has not sent any uplink signal to the network device when the second duration expires, the operating frequency of the terminal device is the first frequency within the second duration. The rest may be deduced by analogy.

The third sub-condition is relatively applicable to a scenario in which the network device does not schedule the terminal device for a long time period. For example, after scheduling the terminal device to send the first uplink signal on the first uplink carrier, the network device does not schedule the terminal device for a long time period. In this case, in the foregoing manner of cyclically timing the second duration, the terminal device may maintain the operating frequency at the first frequency in the time period in which the network device performs no scheduling. Therefore, when scheduling the terminal device again, the network device may learn that the operating frequency of the terminal device is the first frequency, and may determine, based on a scheduling situation, whether the terminal device needs to switch the operating frequency. If the terminal device needs to switch the operating frequency, the network device may reserve a corresponding time period for the terminal device to switch the operating frequency. In this way, a probability that the terminal device discards a signal is reduced.

If the first frequency is the frequency corresponding to the first uplink carrier, that the terminal device sets the operating frequency of the terminal device based on the third sub-condition may also be understood as that the terminal device maintains a correspondence between the operating frequency of the terminal device and the first uplink carrier based on the third sub-condition. Alternatively, if the first frequency is not the frequency corresponding to the first uplink carrier, that the terminal device sets the operating frequency of the terminal device based on the third sub-condition may also be understood as that the terminal device switches the operating frequency of the terminal device based on the third sub-condition.

It should be noted that the third sub-condition may be understood as: If the terminal device sends no uplink signal to the network device within the second duration after a second moment, the operating frequency of the terminal device corresponds to the first frequency after the second duration. In the third sub-condition, the second moment is an end moment at which the terminal device sends the first uplink signal. The second moment is not limited in this embodiment of this application. The second moment may alternatively be another moment, for example, a start moment at which the terminal device sends the first uplink signal, an end moment at which the terminal device receives the first signaling used to indicate the terminal device to send the first uplink signal, an end moment of receiving a downlink signal used to carry the first signaling indicating the terminal device to send the first uplink signal, or a moment after these end moments.

4. Fourth sub-condition: If the terminal device sends no uplink signal to the network device within first duration after the terminal device sends the first uplink signal, the operating frequency of the terminal device corresponds to the first uplink carrier within the first duration; and if the terminal device sends no uplink signal to the network device within second duration after the terminal device sends the first uplink signal, the operating frequency of the terminal device corresponds to the first frequency after the second duration.

The fourth sub-condition is equivalent to a combination of the second sub-condition and the third sub-condition.

For example, the terminal device may start timing after sending the first uplink signal (for example, when completing sending of the first uplink signal). If the terminal device has not sent any uplink signal to the network device when the first duration expires, the operating frequency of the terminal device corresponds to the first uplink carrier within the first duration. The frequency of the terminal device is not limited after the first duration. For example, the terminal device may determine, based on a situation, whether to switch the operating frequency of the terminal device, and the network device may perform no control. For example, the terminal device may perform timing by using a first timer or in another manner. The first duration may be configured by the network device, or may be stipulated in a protocol. In addition, for example, the terminal device may start timing after sending the first uplink signal (for example, when completing sending of the first uplink signal). If the terminal device has not sent any uplink signal to the network device when the second duration expires, the operating frequency of the terminal device is the first frequency after the second duration. The frequency of the terminal device is not limited within the second duration. For example, the terminal device may determine, based on a situation, whether to switch the operating frequency of the terminal device, and the network device may perform no control. For example, the terminal device may perform timing by using a second timer or in another manner. The second duration may be configured by the network device, or may be stipulated in a protocol.

Figure 9:
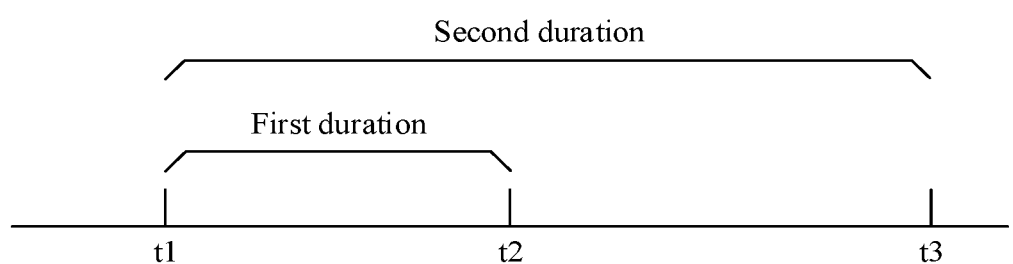
FIG. 9 is a schematic diagram of an example of first duration and second duration according to an embodiment of this application.

For example, a length of the second duration is greater than that of the first duration. Refer to FIG. 9. t1 in FIG. 9 represents a moment of completing sending of the first uplink signal, and the terminal device starts timing from t1. t2 represents an end moment of the first duration, and t3 represents an end moment of the second duration. For example, if the terminal device sends no uplink signal to the network device between the moment t1 and the moment t2, the operating frequency of the terminal device remains at a frequency corresponding to the first uplink carrier between the moment t1 and the moment t2. For example, if the terminal device sends no uplink signal to the network device between the moment t1 and the moment t3 (in other words, between the moment t1 and the moment t2 and between the moment t2 and the moment t3), the operating frequency of the terminal device remains at the first frequency after the moment t3. The frequency of the terminal device is not limited between the moment t2 and the moment t3.

For description of corresponding details of the fourth sub-condition, refer to the description of the second sub-condition or the third sub-condition correspondingly.

If the first frequency is the frequency corresponding to the first uplink carrier, that the terminal device sets the operating frequency of the terminal device based on the fourth sub-condition may also be understood as that the terminal device maintains a correspondence between the operating frequency of the terminal device and the first uplink carrier based on the fourth sub-condition. Alternatively, if the first frequency is not the frequency corresponding to the first uplink carrier, that the terminal device sets the operating frequency of the terminal device based on the fourth sub-condition may also be understood as that the terminal device switches the operating frequency of the terminal device based on the fourth sub-condition.

S83: The terminal device sets the operating frequency. For example, the terminal device may set the operating frequency based on the first condition.

For the first condition, refer to the description in S82. S82 may be performed before S83, or may be performed after S83, or S82 and S83 may be simultaneously performed.

For example, if the terminal device sets the operating frequency of the terminal device based on the foregoing first sub-condition, and if the network device needs to schedule the terminal device after receiving the first uplink signal from the terminal device on the first uplink carrier, the network device may determine that the operating frequency of the terminal device corresponds to the first uplink carrier. Alternatively, for example, if the terminal device sets the operating frequency of the terminal device based on the foregoing second sub-condition or the foregoing fourth sub-condition, and if the network device needs to schedule the terminal device within the first duration, the network device may determine that the operating frequency of the terminal device corresponds to the first uplink carrier. In this case, if the network device needs to schedule the terminal device to send an uplink signal at the frequency corresponding to the first uplink carrier, in other words, if the network device continues to schedule the terminal device to send the uplink signal on the first uplink carrier, the network device performs direct scheduling without indicating the terminal device to switch the operating frequency, and the terminal device can complete sending of the uplink signal without switching the operating frequency. For example, the network device sends second signaling to the terminal device, where the second signaling is used to schedule the terminal device to send the second uplink signal to the network device on the first uplink carrier. In this case, the second signaling does not need to indicate the terminal device to set the operating frequency of the terminal device, and the terminal device does not need to set the operating frequency, but directly sends the second uplink signal to the network device. The network device may receive the second uplink signal from the terminal device on the first uplink carrier. "Setting" the operating frequency herein may be understood as "switching" the operating frequency.

Alternatively, after the network device receives the first uplink signal from the terminal device on the first uplink carrier, if the network device needs to schedule the terminal device to send an uplink signal at a frequency not corresponding to the first uplink carrier, or the network device needs to schedule the terminal device to send an uplink signal within the first duration at a frequency not corresponding to the first uplink carrier, in other words, the network device needs to schedule the terminal device to send an uplink signal on another uplink carrier, the network device may indicate, when scheduling the terminal device, the terminal device to set the operating frequency of the terminal device. For example, the network device sends second signaling to the terminal device, where the second signaling is used to schedule the terminal device to send the second uplink signal to the network device on the second uplink carrier. In this case, the second signaling may indicate the terminal device to set the operating frequency of the terminal device, and may further indicate the second frequency. The second frequency is a target frequency to which the terminal device needs to set the operating frequency. This means that the terminal device needs to set the operating frequency of the terminal device based on the second frequency, in other words, the terminal device needs to set the operating frequency of the terminal device to the second frequency. Alternatively, the second signaling may indicate only the second frequency without indicating the terminal device to set the operating frequency of the terminal device, and the second signaling may further indicate one or more OFDM symbols. In this case, the terminal device may set the operating frequency of the terminal device to the second frequency on the one or more OFDM symbols. The terminal device may send the second uplink signal to the network device on the second uplink carrier after setting the operating frequency, and the network device may receive the second uplink signal from the terminal device on the second uplink carrier.

For example, if the terminal device sets the operating frequency of the terminal device based on the foregoing third sub-condition or the foregoing fourth sub-condition, and if the network device needs to schedule the terminal device after the second duration, the network device may determine that the operating frequency of the terminal device is the first frequency. In this case, if the network device needs to schedule the terminal device to send an uplink signal at the first frequency, the network device performs direct scheduling without indicating the terminal device to switch the operating frequency, and the terminal device can complete sending of the uplink signal without switching the operating frequency. For example, the network device sends second signaling to the terminal device, where the second signaling is used to schedule the terminal device to send the second uplink signal to the network device at the first frequency. In this case, the second signaling does not need to indicate the terminal device to set the operating frequency of the terminal device, and the terminal device does not need to set the operating frequency, but directly sends the second uplink signal to the network device. The network device may receive the second uplink signal from the terminal device at the first frequency. "Setting" the operating frequency herein may be understood as "switching" the operating frequency.

Alternatively, if the network device needs to schedule the terminal device to send an uplink signal at the second frequency within the second duration, in other words, the network device needs to schedule the terminal device to send the uplink signal at a frequency other than the first frequency, when scheduling the terminal device, the network device may indicate the terminal device to set the operating frequency of the terminal device. For example, the network device sends second signaling to the terminal device, where the second signaling is used to schedule the terminal device to send the second uplink signal to the network device at the second frequency. In this case, the second signaling may indicate the terminal device to set the operating frequency of the terminal device, and may further indicate the second frequency. The second frequency is a target frequency to which the terminal device needs to set the operating frequency. This means that the terminal device needs to set the operating frequency of the terminal device based on the second frequency, in other words, the terminal device needs to set the operating frequency of the terminal device to the second frequency. Alternatively, the second signaling may indicate only the second frequency without indicating the terminal device to set the operating frequency of the terminal device, and the second signaling may further indicate one or more OFDM symbols. In this case, the terminal device may set the operating frequency of the terminal device to the second frequency on the one or more OFDM symbols. The terminal device may send the second uplink signal to the network device at the second frequency after setting the operating frequency, and the network device may receive the second uplink signal from the terminal device at the second frequency.

In this embodiment of this application, the terminal device may set the operating frequency based on the first condition, and the network device may learn that the terminal device sets the operating frequency based on the first condition, so that the network device can determine the operating frequency of the terminal device. In this way, when scheduling the terminal device, the network device may determine whether to reserve a time period for the terminal device to set the operating frequency. This reduces the probability that the terminal device discards a signal and improves signal transmission quality.

Figure 10:
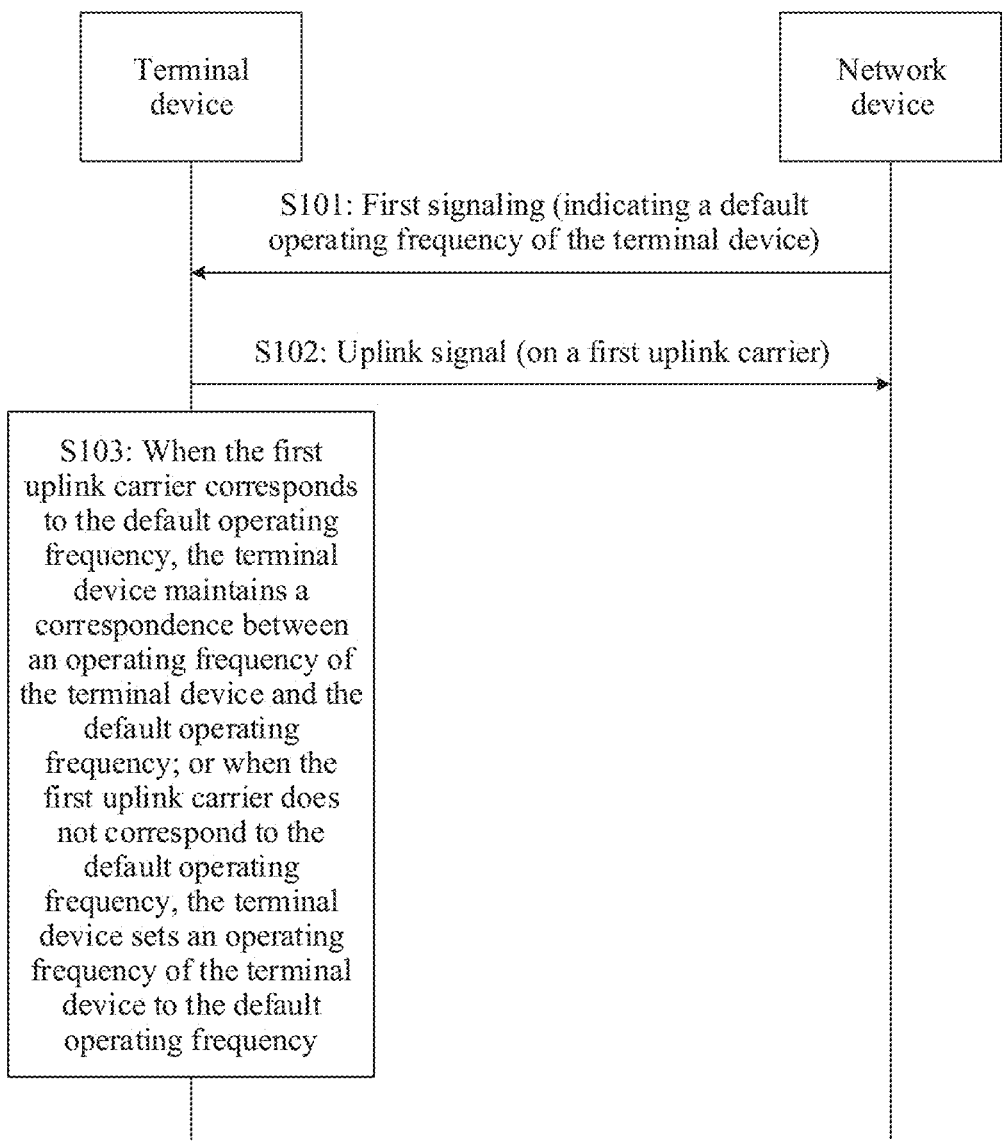
FIG. 10 is a flowchart of a third communication method according to an embodiment of this application.

To resolve the same technical problem, an embodiment of this application provides a third communication method. FIG. 10 is a flowchart of the method. An example in which the method is applied to the network architecture shown in any one of FIG. 3 to FIG. 6 is used in the following description process. In addition, the method may be performed by two communication apparatuses. The two communication apparatuses are, for example, a fifth communication apparatus and a sixth communication apparatus. The fifth communication apparatus may be a network device or a communication apparatus that can support the network device in implementing functions required by the method, or may be a terminal device or a communication apparatus that can support the terminal device in implementing functions required by the method. Certainly, the fifth communication apparatus may alternatively be another communication apparatus, for example, a chip system. The sixth communication apparatus may be a network device or a communication apparatus that can support the network device in implementing functions required by the method, or may be a terminal device or a communication apparatus that can support the terminal device in implementing functions required by the method. Certainly, the sixth communication apparatus may alternatively be another communication apparatus, for example, a chip system. In addition, implementations of the fifth communication apparatus and the sixth communication apparatus are not limited. For example, the fifth communication apparatus may be a network device, and the sixth communication apparatus is a terminal device; both the fifth communication apparatus and the sixth communication apparatus are network devices; both the fifth communication apparatus and the sixth communication apparatus are terminal devices; or the fifth communication apparatus is a network device, and the sixth communication apparatus is a chip system that can support a terminal device in implementing functions required by the method. For example, the network device is a base station.

For ease of description, the following uses an example in which the method is performed by a network device and a terminal device, namely, an example in which the fifth communication apparatus is a terminal device and the sixth communication apparatus is a network device. If this embodiment of this application is applied to the network architecture shown in any one of FIG. 3 to FIG. 6, the terminal device described below may be the terminal device in the network architecture shown in any one of FIG. 3 to FIG. 6. In addition, the network device described below may be the LTE network device or the NR network device in the network architecture shown in any one of FIG. 3 to FIG. 6.

S101: The network device sends first signaling to the terminal device, and the terminal device receives the first signaling from the network device, where the first signaling indicates a default operating frequency of the terminal device.

For example, the default operating frequency may be a predetermined frequency.

In an implementation of the predetermined frequency, the predetermined frequency may be indicated by the first signaling sent by the network device to the terminal device. For example, if the network device sends the first signaling to the terminal device, and the terminal device receives the first signaling from the network device, where the first signaling indicates the default operating frequency, the terminal device may determine the default operating frequency. The first signaling is, for example, DCI, or may be information of another type, for example, higher layer signaling. The higher layer signaling is, for example, RRC signaling or MAC layer signaling.

For example, the default operating frequency may be determined based on a frequency corresponding to a second uplink carrier, and the second uplink carrier is, for example, a high frequency carrier or a low frequency carrier, or may be a carrier preconfigured by the network device. For example, the second uplink carrier is an uplink carrier on which a PUCCH is configured for the terminal device. The default operating frequency may be determined based on a frequency corresponding to the uplink carrier on which the PUCCH is configured for the terminal device. For example, the default operating frequency is the frequency corresponding to the uplink carrier on which the PUCCH is configured for the terminal device. Alternatively, the default operating frequency may be a frequency corresponding to an uplink carrier supported by the terminal device other than the uplink carrier on which the PUCCH is configured.

In another implementation of the predetermined frequency, the predetermined frequency may be a predefined frequency. For example, the predetermined frequency is predefined in a protocol, or is preconfigured in the terminal device. For example, a predefined frequency may be a frequency corresponding to a low frequency carrier in at least two uplink carriers, or may be a frequency corresponding to a high frequency carrier in the at least two uplink carriers. For another example, when at least two uplink carriers include an SUL carrier and a common uplink carrier, a predefined frequency may be a frequency corresponding to the SUL carrier, or may be a frequency corresponding to the common uplink carrier. For still another example, when at least two uplink carriers include an LTE uplink carrier and an NR uplink carrier, a predefined frequency may be a frequency corresponding to the NR uplink carrier, or may be a frequency corresponding to the LTE uplink carrier. For yet another example, when at least two uplink carriers include an uplink carrier in a primary cell and an uplink carrier in a secondary cell, a predefined frequency may be a frequency corresponding to the uplink carrier in the primary cell. In this case, the network device may not need to send the first signaling to the terminal device, and therefore S101 does not need to be performed. Alternatively, although the network device sends the first signaling to the terminal device, the first signaling may not need to indicate the default operating frequency.

How to determine the predetermined frequency is not specifically limited.

S102: The terminal device sends an uplink signal to the network device on a first uplink carrier, and the network device receives the uplink signal from the terminal device on the first uplink carrier.

In this embodiment of this application, an antenna of the terminal device may operate on the at least two uplink carriers, but can operate on only one of the at least two uplink carriers at one moment. The at least two uplink carriers include the first uplink carrier, and the first uplink carrier is, for example, a common uplink carrier or an SUL carrier. The at least two uplink carriers may include one NR uplink carrier and one LTE uplink carrier, or include uplink carriers in two different cells. This is not specifically limited.

Optionally, before the terminal device sends the uplink signal to the network device on the first uplink carrier, the network device may send the first signaling to the terminal device, and the terminal device receives the first signaling from the network device, where the first signaling indicates the terminal device to send the uplink signal to the network device on the first uplink carrier, and the first signaling is carried in a downlink signal. When the first uplink carrier corresponds to the default operating frequency, if duration between an end moment at which the terminal device receives the downlink signal and a start moment at which the terminal device sends the uplink signal is less than first duration, the terminal device may ignore the indication by the first signaling. When the first uplink carrier does not correspond to the default operating frequency, if duration between an end moment at which the terminal device receives the downlink signal and a start moment at which the terminal device sends the uplink signal is less than second duration, the terminal device may ignore the indication by the first signaling. The first duration is less than the second duration.

It should be understood that when the first uplink carrier corresponds to the default operating frequency, the terminal device does not need to change an operating frequency; and when the first uplink carrier does not correspond to the default operating frequency, the terminal device needs to set an operating frequency from the default operating frequency to a frequency corresponding to the first uplink carrier. Therefore, this case requires a longer processing time period than a case in which the first uplink carrier corresponds to the default operating frequency.

S103: When the first uplink carrier corresponds to the default operating frequency, the terminal device maintains a correspondence between the operating frequency of the terminal device and the default operating frequency; or when the first uplink carrier does not correspond to the default operating frequency, the terminal device sets the operating frequency of the terminal device to the default operating frequency.

After the terminal device sends the uplink signal to the network device, the terminal device may set the operating frequency of the terminal device to the default operating frequency. That is, in this embodiment of this application, regardless of a frequency at which the terminal device sends the uplink signal to the network device, after the sending is completed, if the frequency is the default operating frequency, the terminal device continues to maintain the operating frequency of the terminal device at the default operating frequency; or if the frequency is not the default operating frequency, the terminal device may switch the operating frequency of the terminal device to the default operating frequency. This means that the terminal device continuously maintains the operating frequency at the default operating frequency. In this way, when scheduling the terminal device, the network device can learn that the operating frequency of the terminal device is the default operating frequency.

For example, the network device needs to schedule the terminal device, and the network device may determine that the operating frequency of the terminal device is the default operating frequency. In this case, if the network device needs to schedule the terminal device to send an uplink signal at the default operating frequency, the network device performs direct scheduling, and the terminal device can complete sending of the uplink signal without switching the operating frequency. For example, the network device sends second signaling to the terminal device, where the second signaling is used to schedule the terminal device to send a second uplink signal to the network device at the default operating frequency. In this case, the terminal device does not need to set the operating frequency, but directly sends the second uplink signal to the network device. The network device may receive the second uplink signal from the terminal device at the default operating frequency. "Setting" the operating frequency herein may be understood as "switching" the operating frequency.

Alternatively, if the network device needs to schedule the terminal device to send an uplink signal at a first frequency, where the first frequency is not the default operating frequency, in other words, the network device needs to schedule the terminal device to send the uplink signal at a frequency other than the default operating frequency, when scheduling the terminal device, the network device may indicate the terminal device to set the operating frequency of the terminal device. For example, the network device sends second signaling to the terminal device, where the second signaling is used to schedule the terminal device to send a second uplink signal to the network device at a second frequency. In this case, the second signaling may indicate the terminal device to set the operating frequency of the terminal device, and may further indicate the first frequency. The first frequency is a target frequency to which the terminal device needs to set the operating frequency. This means that the terminal device needs to set the operating frequency of the terminal device based on the first frequency, in other words, the terminal device needs to set the operating frequency of the terminal device to the first frequency. Alternatively, the second signaling may indicate only the first frequency without indicating the terminal device to set the operating frequency of the terminal device, and the second signaling may further indicate one or more OFDM symbols. In this case, the terminal device may set the operating frequency of the terminal device to the first frequency on the one or more OFDM symbols. The terminal device may send the second uplink signal to the network device at the first frequency after setting the operating frequency, and the network device may receive the second uplink signal from the terminal device at the first frequency.

In this embodiment of this application, the default operating frequency may be set. In this case, regardless of a frequency at which the terminal device sends the uplink signal to the network device, after the sending is completed, if the frequency is the default operating frequency, the terminal device continues to maintain the operating frequency of the terminal device at the default operating frequency; or if the frequency is not the default operating frequency, the terminal device may switch the operating frequency of the terminal device to the default operating frequency. This means that the terminal device continuously maintains the operating frequency at the default operating frequency. In this way, when scheduling the terminal device, the network device can learn that the operating frequency of the terminal device is the default operating frequency.

The following describes, with reference to the accompanying drawings, apparatuses configured to implement the foregoing methods in the embodiments of this application. Therefore, all the foregoing content may be used in subsequent embodiments, and repeated content is not described again.

Figure 11:
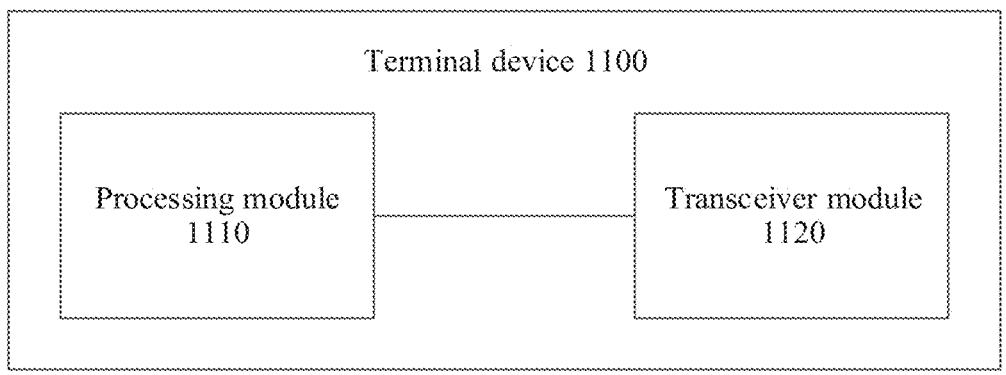
FIG. 11 is a schematic block diagram of a first terminal device according to an embodiment of this application.

FIG. 11 is a schematic block diagram of a communication device 1100 according to an embodiment of this application. For example, the communication device 1100 is a terminal device 1100. The terminal device 1100 includes a processing module 1110 and a transceiver module 1120. The processing module 1110 may be configured to perform all operations, such as S73, that are performed by the terminal device in the embodiment shown in FIG. 7 except sending and receiving operations, and/or configured to support another process of the technology described in this specification. The transceiver module 1120 may be configured to perform all the sending and receiving operations, such as S71 and S72, that are performed by the terminal device in the embodiment shown in FIG. 7, and/or configured to support another process of the technology described in this specification. The transceiver module 1120 may be one functional module, or may be a general term of two functional modules. The two functional modules are a sending module and a receiving module. The sending module is configured to perform all the sending operations, such as S72, that are performed by the terminal device in the embodiment shown in FIG. 7, and/or is configured to support another process of the technology described in this specification. The receiving module is configured to perform all the receiving operations, such as S71, that are performed by the terminal device in the embodiment shown in FIG. 7, and/or is configured to support another process of the technology described in this specification.

For example, the transceiver module 1120 is configured to receive first signaling from a network device, where the first signaling indicates to send a first uplink signal to the network device on a first uplink carrier, and the first signaling further indicates a first frequency.

The processing module 1110 is configured to set an operating frequency based on the first frequency.

In an optional implementation, the processing module 1110 is configured to set the operating frequency based on the first frequency in the following manner:

setting the operating frequency based on the first frequency after the transceiver module 1120 sends the first uplink signal;

setting the operating frequency based on the first frequency before a first time period of sending the first uplink signal by the transceiver module 1120 ends, where the first time period is a time domain resource used to send the first uplink signal; or setting the operating frequency based on the first frequency before an end moment of a time unit in which the first uplink signal is located arrives.

In an optional implementation, the first frequency corresponds to the first uplink carrier, or the first frequency corresponds to a second uplink carrier.

In an optional implementation, the transceiver module 1120 is further configured to receive second signaling from the network device, where the second signaling indicates to send a second uplink signal to the network device on the first uplink carrier, the second uplink signal and the first uplink signal are in the same time unit, and the second uplink signal is after the first uplink signal.

In an optional implementation, the processing module 1110 is configured to set the operating frequency based on the first frequency in the following manner after the transceiver module sends the first uplink signal on the first uplink carrier: setting the operating frequency based on the first frequency after the transceiver module 1120 sends the first uplink signal and the second uplink signal; or the processing module 1110 is configured to set the operating frequency based on the first frequency in the following manner before the end moment of the time unit in which the first uplink signal is located: setting the operating frequency based on the first frequency after the transceiver module 1120 sends the first uplink signal and the second uplink signal and before the end moment of the time unit in which the first uplink signal is located.

It should be understood that the processing module 1110 in this embodiment of this application may be implemented by a processor or a processor-related circuit component, and the transceiver module 1120 may be implemented by a transceiver or a transceiver-related circuit component.

Figure 12:
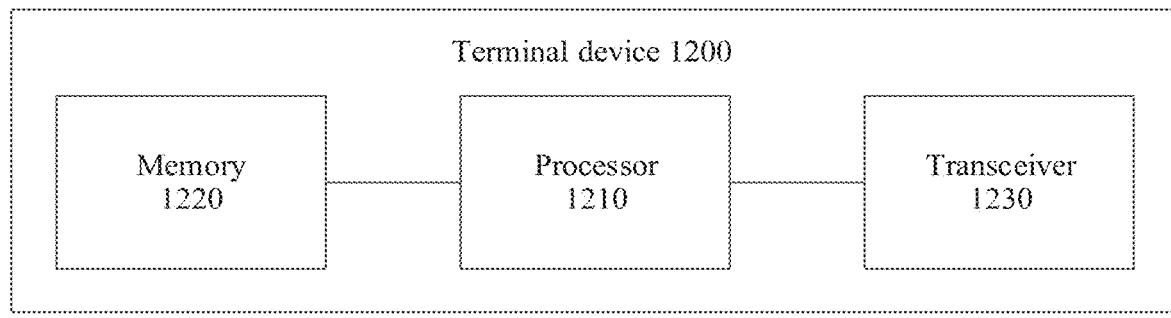
FIG. 12 is another schematic block diagram of a first terminal device according to an embodiment of this application.

As shown in FIG. 12, an embodiment of this application further provides a communication device 1200. For example, the communication device 1200 is a terminal device 1200. The terminal device 1200 includes a processor 1210, a memory 1220, and a transceiver 1230. The memory 1220 stores instructions or a program. The processor 1210 is configured to execute the instructions or the program stored in the memory 1220. When the instructions or the program stored in the memory 1220 are/is executed, the processor 1210 is configured to perform operations performed by the processing module 1110 in the foregoing embodiment, and the transceiver 1230 is configured to perform operations performed by the transceiver module 1120 in the foregoing embodiment. The transceiver 1230 may be one functional component, and the functional component may complete both a receiving function and a sending function. Alternatively, the transceiver 1230 may be a general term of two functional components, and the two functional components are a transmitter and a receiver. The transmitter is configured to complete a function of the terminal device 1200 in sending information to another device, and the receiver is configured to complete a function of the terminal device 1200 in receiving information from the another device.

It should be understood that the terminal device 1100 or the terminal device 1200 in the embodiments of this application may correspond to the terminal device in the embodiment shown in FIG. 7, and operations and/or functions of the modules in the terminal device 1100 or the terminal device 1200 are intended to implement corresponding procedures in the embodiment shown in FIG. 7. For brevity, details are not described herein again.

Figure 13:
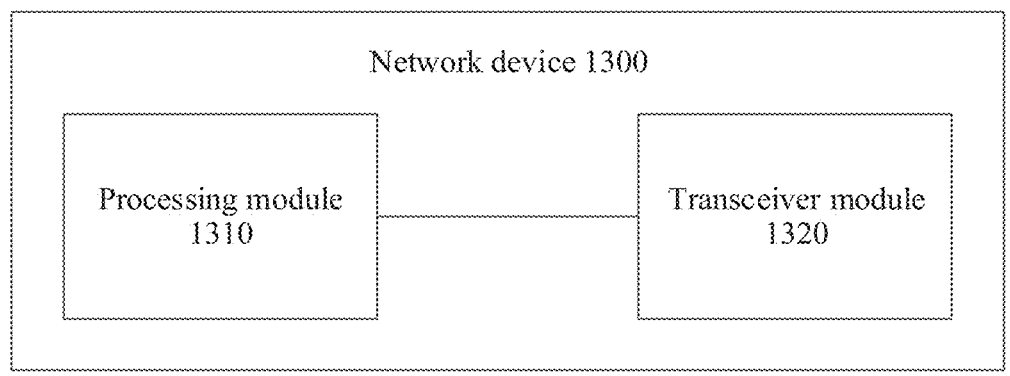
FIG. 13 is a schematic block diagram of a first network device according to an embodiment of this application.

FIG. 13 is a schematic block diagram of a communication device 1300 according to an embodiment of this application. For example, the communication device 1300 is a network device 1300. The network device 1300 includes a processing module 1310 and a transceiver module 1320. The processing module 1310 may be configured to perform all operations, such as a step of generating first signaling, that are performed by the network device in the embodiment shown in FIG. 7 except sending and receiving operations, and/or configured to support another process of the technology described in this specification. The transceiver module 1320 may be configured to perform all the sending and receiving operations, such as S71 and S72, that are performed by the network device in the embodiment shown in FIG. 7, and/or configured to support another process of the technology described in this specification. The transceiver module 1320 may be one functional module, or may be a general term of two functional modules. The two functional modules are a sending module and a receiving module. The sending module is configured to perform all the sending operations, such as S71, that are performed by the network device in the embodiment shown in FIG. 7, and/or is configured to support another process of the technology described in this specification. The receiving module is configured to perform all the receiving operations, such as S72, that are performed by the network device in the embodiment shown in FIG. 7, and/or is configured to support another process of the technology described in this specification.

For example, the transceiver module 1320 is configured to send the first signaling to a terminal device, where the first signaling indicates the terminal device to send a first uplink signal to the network device 1300 on a first uplink carrier, and the first signaling further indicates a first frequency.

In an optional implementation, the first frequency is used to:

set an operating frequency by the terminal device based on the first frequency after the terminal device sends the first uplink signal on the first uplink carrier;

set an operating frequency by the terminal device based on the first frequency before a first time period of sending the first uplink signal on the first uplink carrier ends, where the first time period is a time domain resource used to send the first uplink signal; or set an operating frequency by the terminal device based on the first frequency before an end moment of a time unit in which the first uplink signal is located arrives.

In an optional implementation, the first frequency corresponds to the first uplink carrier, or the first frequency corresponds to a second uplink carrier.

In an optional implementation, the transceiver module 1320 is further configured to send second signaling to the terminal device, where the second signaling indicates the terminal device to send a second uplink signal to the network device 1300 on the first uplink carrier, the second uplink signal and the first uplink signal are in the same time unit, and the second uplink signal is after the first uplink signal.

It should be understood that the processing module 1310 in this embodiment of this application may be implemented by a processor or a processor-related circuit component, and the transceiver module 1320 may be implemented by a transceiver or a transceiver-related circuit component.

Figure 14:
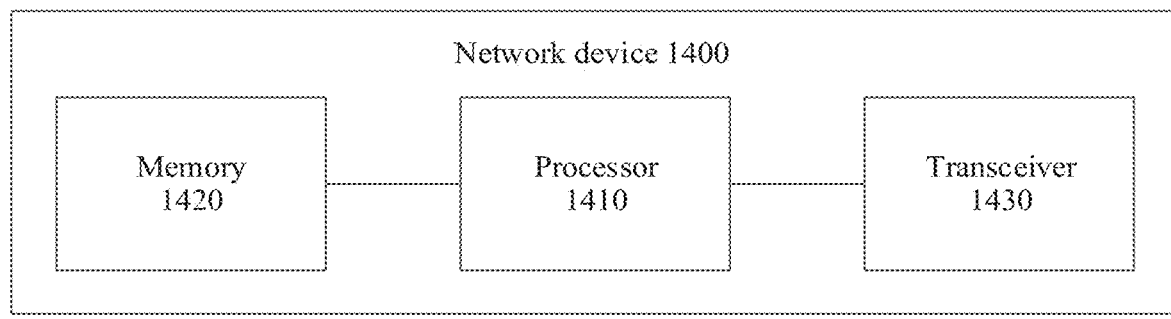
FIG. 14 is another schematic block diagram of a first network device according to an embodiment of this application.

As shown in FIG. 14, an embodiment of this application further provides a communication device 1400. For example, the communication device 1400 is a network device 1400. The network device 1400 includes a processor 1410, a memory 1420, and a transceiver 1430. The memory 1420 stores instructions or a program. The processor 1410 is configured to execute the instructions or the program stored in the memory 1420. When the instructions or the program stored in the memory 1420 are/is executed, the processor 1410 is configured to perform operations performed by the processing module 1310 in the foregoing embodiment, and the transceiver 1430 is configured to perform operations performed by the transceiver module 1320 in the foregoing embodiment. The transceiver 1430 may be one functional component, and the functional component may complete both a receiving function and a sending function. Alternatively, the transceiver 1430 may be a general term of two functional components, and the two functional components are a transmitter and a receiver. The transmitter is configured to complete a function of the network device 1400 in sending information to another device, and the receiver is configured to complete a function of the network device 1400 in receiving information from the another device.

It should be understood that the network device 1300 or the network device 1400 in the embodiments of this application may correspond to the network device in the embodiment shown in FIG. 7, and operations and/or functions of the modules in the network device 1300 or the network device 1400 are intended to implement corresponding procedures in the embodiment shown in FIG. 7. For brevity, details are not described herein again.

Figure 15:
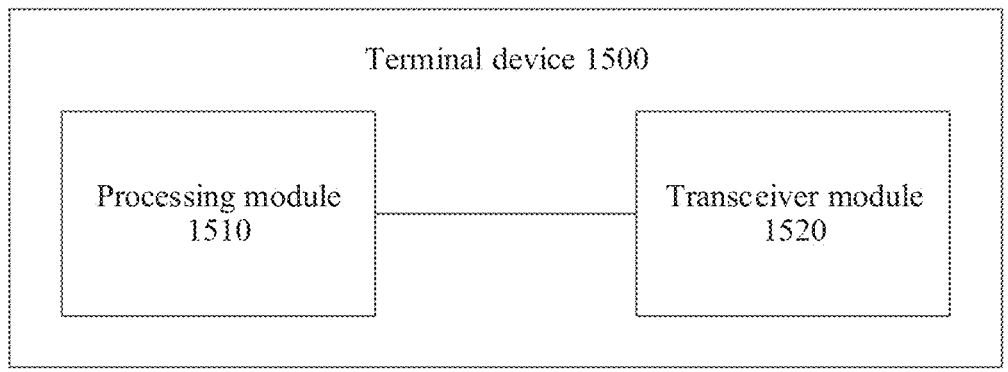
FIG. 15 is a schematic block diagram of a second terminal device according to an embodiment of this application.

FIG. 15 is a schematic block diagram of a communication device 1500 according to an embodiment of this application. For example, the communication device 1500 is a terminal device 1500. The terminal device 1500 includes a processing module 1510 and a transceiver module 1520. The processing module 1510 may be configured to perform all operations, such as S83, that are performed by the terminal device in the embodiment shown in FIG. 8 except sending and receiving operations, and/or configured to support another process of the technology described in this specification. The transceiver module 1520 may be configured to perform all the sending and receiving operations, such as S81, that are performed by the terminal device in the embodiment shown in FIG. 8, and/or configured to support another process of the technology described in this specification. The transceiver module 1520 may be one functional module, or may be a general term of two functional modules. The two functional modules are a sending module and a receiving module. The sending module is configured to perform all the sending operations performed by the terminal device in the embodiment shown in FIG. 8, and/or is configured to support another process of the technology described in this specification. The receiving module is configured to perform all the receiving operations performed by the terminal device in the embodiment shown in FIG. 8, and/or is configured to support another process of the technology described in this specification.

For example, the transceiver module 1520 is configured to send a first uplink signal to a network device on a first uplink carrier.

The processing module 1510 is configured to set an operating frequency of the terminal device 1500 based on a first condition.

In an optional implementation, the first condition includes:

before an uplink signal is sent to the network device on an uplink carrier other than the first uplink carrier, the operating frequency of the terminal device 1500 corresponds to the first uplink carrier;

if no uplink signal is sent to the network device within first duration after the first uplink signal is sent, the operating frequency of the terminal device 1500 corresponds to the first uplink carrier within the first duration;

if no uplink signal is sent to the network device within second duration after the first uplink signal is sent, the operating frequency of the terminal device 1500 corresponds to a first frequency after the second duration; or if no uplink signal is sent to the network device within first duration after the first uplink signal is sent, the operating frequency of the terminal device 1500 corresponds to the first uplink carrier within the first duration: and if no uplink signal is sent to the network device within second duration after the first uplink signal is sent, the operating frequency of the terminal device 1500 corresponds to a first frequency after the second duration.

In an optional implementation, the first frequency is a predetermined frequency.

In an optional implementation, the predetermined frequency is determined based on a frequency corresponding to an uplink carrier on which a PUCCH is configured for the terminal device 1500;

the predetermined frequency is determined based on first signaling received by the terminal device 1500 from the network device; or the predetermined frequency is a predefined frequency.

It should be understood that the processing module 1510 in this embodiment of this application may be implemented by a processor or a processor-related circuit component, and the transceiver module 1520 may be implemented by a transceiver or a transceiver-related circuit component.

Figure 16:
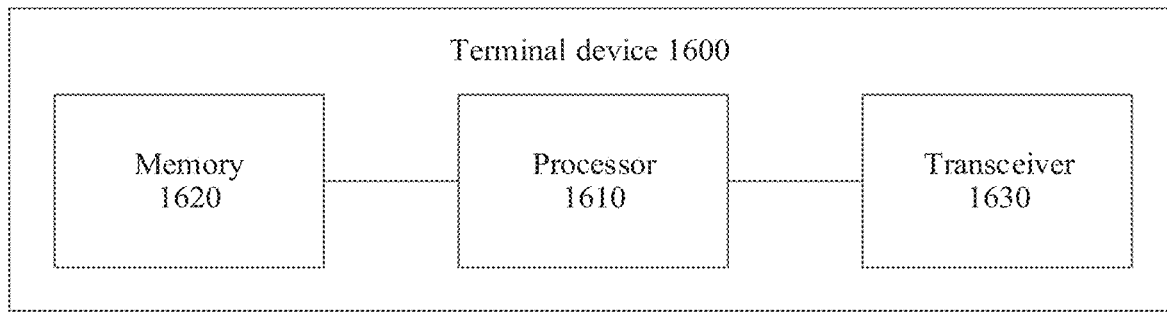
FIG. 16 is another schematic block diagram of a second terminal device according to an embodiment of this application.

As shown in FIG. 16, an embodiment of this application further provides a communication device 1600. For example, the communication device 1600 is a terminal device 1600. The terminal device 1600 includes a processor 1610, a memory 1620, and a transceiver 1630. The memory 1620 stores instructions or a program. The processor 1610 is configured to execute the instructions or the program stored in the memory 1620. When the instructions or the program stored in the memory 1620 are/is executed, the processor 1610 is configured to perform operations performed by the processing module 1510 in the foregoing embodiment, and the transceiver 1630 is configured to perform operations performed by the transceiver module 1520 in the foregoing embodiment. The transceiver 1630 may be one functional component, and the functional component may complete both a receiving function and a sending function. Alternatively, the transceiver 1630 may be a general term of two functional components, and the two functional components are a transmitter and a receiver. The transmitter is configured to complete a function of the terminal device 1600 in sending information to another device, and the receiver is configured to complete a function of the terminal device 1600 in receiving information from the another device.

It should be understood that the terminal device 1500 or the terminal device 1600 in the embodiments of this application may correspond to the terminal device in the embodiment shown in FIG. 8, and operations and/or functions of the modules in the terminal device 1500 or the terminal device 1600 are intended to implement corresponding procedures in the embodiment shown in FIG. 8. For brevity, details are not described herein again.

Figure 17:
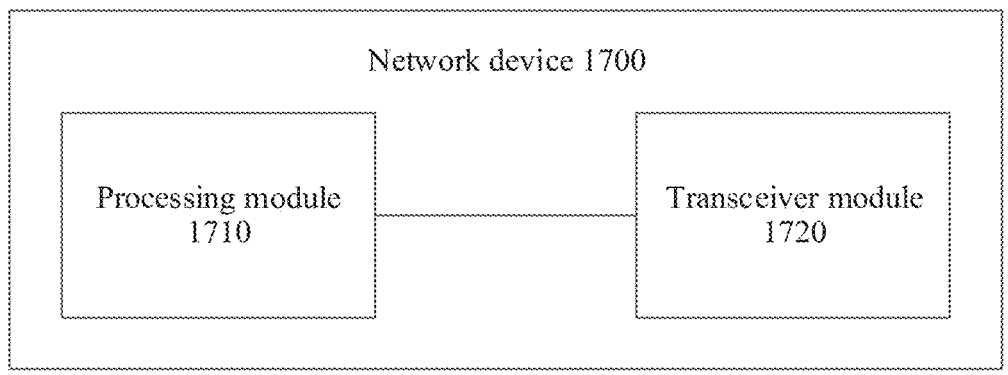
FIG. 17 is a schematic block diagram of a second network device according to an embodiment of this application.

FIG. 17 is a schematic block diagram of a communication device 1700 according to an embodiment of this application. For example, the communication device 1700 is a network device 1700. The network device 1700 includes a processing module 1710 and a transceiver module 1720. The processing module 1710 may be configured to perform all operations, such as S82, that are performed by the network device in the embodiment shown in FIG. 8 except sending and receiving operations, and/or configured to support another process of the technology described in this specification. The transceiver module 1720 may be configured to perform all the sending and receiving operations, such as S81, that are performed by the network device in the embodiment shown in FIG. 8, and/or configured to support another process of the technology described in this specification. The transceiver module 1720 may be one functional module, or may be a general term of two functional modules. The two functional modules are a sending module and a receiving module. The sending module is configured to perform all the sending operations performed by the network device in the embodiment shown in FIG. 8, and/or is configured to support another process of the technology described in this specification. The receiving module is configured to perform all the receiving operations performed by the network device in the embodiment shown in FIG. 8, and/or is configured to support another process of the technology described in this specification.

For example, the transceiver module 1720 is configured to receive a first uplink signal from a terminal device on a first uplink carrier.

The processing module 1710 is configured to determine an operating frequency of the terminal device. For example, the processing module 1710 may directly determine the operating frequency of the terminal device, or may determine that the terminal device sets the operating frequency of the terminal device based on a first condition.

Alternatively, the transceiver module 1720 is configured to receive a first uplink signal from a terminal device on a first uplink carrier; and the processing module 1710 is configured to schedule the terminal device with reference to an operating frequency of the terminal device after the transceiver module 1720 receives the first uplink signal. The operating frequency of the terminal device is set based on a first condition.

In an optional implementation, the determining an operating frequency of the terminal device includes:

before the terminal device sends an uplink signal to the network device 1700 on an uplink carrier other than the first uplink carrier, the operating frequency of the terminal device corresponds to the first uplink carrier;

if the terminal device sends no uplink signal to the network device 1700 within first duration after the terminal device sends the first uplink signal, the operating frequency of the terminal device corresponds to the first uplink carrier within the first duration;

if the terminal device sends no uplink signal to the network device 1700 within second duration after the terminal device sends the first uplink signal, the operating frequency of the terminal device corresponds to a first frequency after the second duration; or if the terminal device sends no uplink signal to the network device 1700 within first duration after the terminal device sends the first uplink signal, the operating frequency of the terminal device corresponds to the first uplink carrier within the first duration; and if the terminal device sends no uplink signal to the network device 1700 within second duration after the terminal device sends the first uplink signal, the operating frequency of the terminal device corresponds to a first frequency after the second duration.

In an optional implementation, the first condition includes:

before the terminal device sends an uplink signal to the network device 1700 on an uplink carrier other than the first uplink carrier, the operating frequency of the terminal device corresponds to the first uplink carrier;

if the terminal device sends no uplink signal to the network device 1700 within first duration after the terminal device sends the first uplink signal, the operating frequency of the terminal device corresponds to the first uplink carrier within the first duration;

if the terminal device sends no uplink signal to the network device 1700 within second duration after the terminal device sends the first uplink signal, the operating frequency of the terminal device corresponds to a first frequency after the second duration; or if the terminal device sends no uplink signal to the network device 1700 within first duration after the terminal device sends the first uplink signal, the operating frequency of the terminal device corresponds to the first uplink carrier within the first duration; and if the terminal device sends no uplink signal to the network device 1700 within second duration after the terminal device sends the first uplink signal, the operating frequency of the terminal device corresponds to a first frequency after the second duration.

In an optional implementation, the first frequency is a predetermined frequency.

In an optional implementation, the predetermined frequency is determined based on a frequency corresponding to an uplink carrier on which a PUCCH is configured for the terminal device;

the predetermined frequency is determined based on first signaling received by the terminal device from the network device 1700; or the predetermined frequency is a predefined frequency.

It should be understood that the processing module 1710 in this embodiment of this application may be implemented by a processor or a processor-related circuit component, and the transceiver module 1720 may be implemented by a transceiver or a transceiver-related circuit component.

Figure 18:
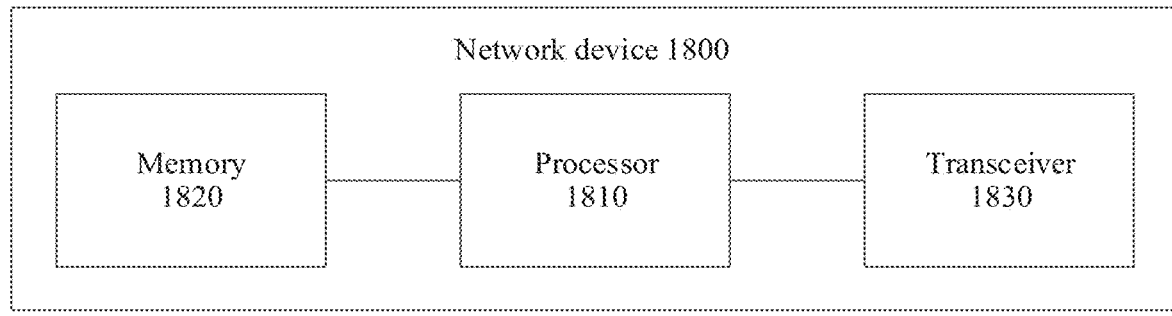
FIG. 18 is another schematic block diagram of a second network device according to an embodiment of this application.

As shown in FIG. 18, an embodiment of this application further provides a communication device 1800. For example, the communication device 1800 is a network device 1800. The network device 1800 includes a processor 1810, a memory 1820, and a transceiver 1830. The memory 1820 stores instructions or a program. The processor 1810 is configured to execute the instructions or the program stored in the memory 1820. When the instructions or the program stored in the memory 1820 are/is executed, the processor 1810 is configured to perform operations performed by the processing module 1710 in the foregoing embodiment, and the transceiver 1830 is configured to perform operations performed by the transceiver module 1720 in the foregoing embodiment. The transceiver 1830 may be one functional component, and the functional component may complete both a receiving function and a sending function. Alternatively, the transceiver 1830 may be a general term of two functional components, and the two functional components are a transmitter and a receiver. The transmitter is configured to complete a function of the network device 1800 in sending information to another device, and the receiver is configured to complete a function of the network device 1800 in receiving information from the another device.

It should be understood that the network device 1700 or the network device 1800 in the embodiments of this application may correspond to the network device in the embodiment shown in FIG. 8, and operations and/or functions of the modules in the network device 1700 or the network device 1800 are intended to implement corresponding procedures in the embodiment shown in FIG. 8. For brevity, details are not described herein again.

Figure 19:
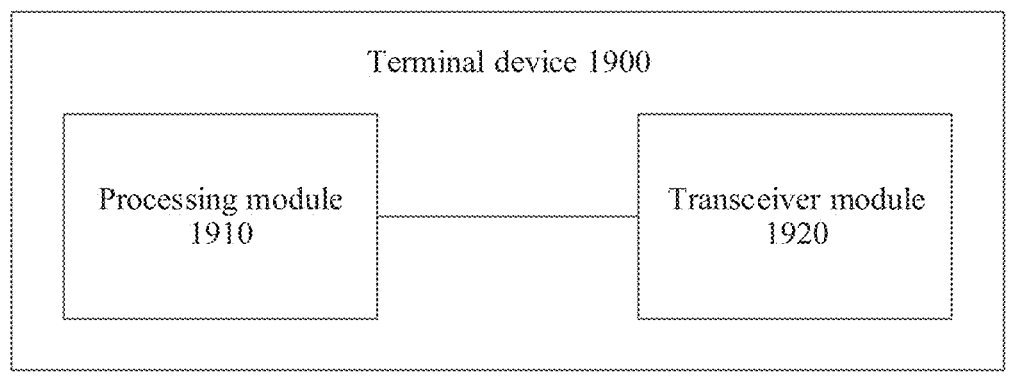
FIG. 19 is a schematic block diagram of a third terminal device according to an embodiment of this application.

FIG. 19 is a schematic block diagram of a communication device 1900 according to an embodiment of this application. For example, the communication device 1900 is a terminal device 1900. The terminal device 1900 includes a processing module 1910 and a transceiver module 1920. The processing module 1910 may be configured to perform all operations, such as S103, that are performed by the terminal device in the embodiment shown in FIG. 10 except sending and receiving operations, and/or configured to support another process of the technology described in this specification. The transceiver module 1920 may be configured to perform all the sending and receiving operations, such as S101 and S102, that are performed by the terminal device in the embodiment shown in FIG. 10, and/or configured to support another process of the technology described in this specification. The transceiver module 1920 may be one functional module, or may be a general term of two functional modules. The two functional modules are a sending module and a receiving module. The sending module is configured to perform all the sending operations, such as S102, that are performed by the terminal device in the embodiment shown in FIG. 10, and/or is configured to support another process of the technology described in this specification. The receiving module is configured to perform all the receiving operations, such as S101, that are performed by the terminal device in the embodiment shown in FIG. 10, and/or is configured to support another process of the technology described in this specification.

For example, the transceiver module 1920 is configured to send an uplink signal on a first uplink carrier.

The processing module 1910 is configured to: when the first uplink carrier corresponds to a default operating frequency, maintain an operating frequency at the default operating frequency; or when the first uplink carrier does not correspond to a default operating frequency, set an operating frequency to the default operating frequency.

In an optional implementation, the default operating frequency is a predetermined frequency.

In an optional implementation, the predetermined frequency is determined based on a frequency corresponding to an uplink carrier on which a PUCCH is configured for the terminal device 1900;

the predetermined frequency is determined based on first signaling received by the terminal device 1900 from a network device; or the predetermined frequency is a predefined frequency.

A specific implementation of the predetermined frequency is not limited in this embodiment of this application.

It should be understood that the processing module 1910 in this embodiment of this application may be implemented by a processor or a processor-related circuit component, and the transceiver module 1920 may be implemented by a transceiver or a transceiver-related circuit component.

Figure 20:
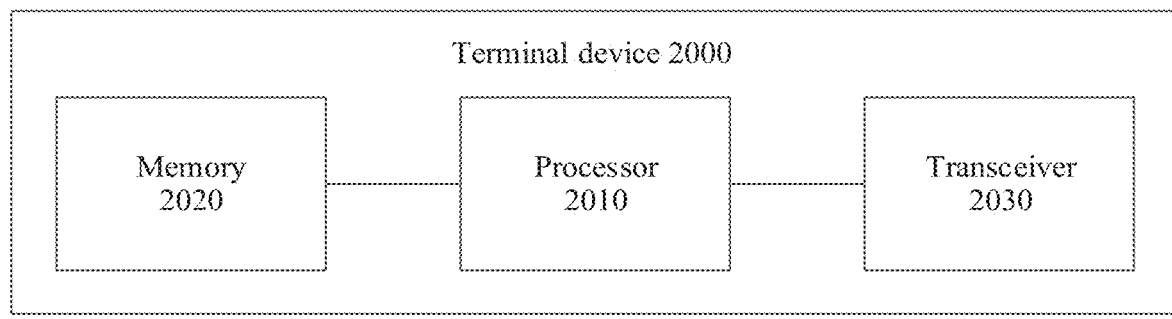
FIG. 20 is another schematic block diagram of a third terminal device according to an embodiment of this application.

As shown in FIG. 20, an embodiment of this application further provides a communication device 2000. For example, the communication device 2000 is a terminal device 2000. The terminal device 2000 includes a processor 2010, a memory 2020, and a transceiver 2030. The memory 2020 stores instructions or a program. The processor 2010 is configured to execute the instructions or the program stored in the memory 2020. When the instructions or the program stored in the memory 2020 are/is executed, the processor 2010 is configured to perform operations performed by the processing module 1910 in the foregoing embodiment, and the transceiver 2030 is configured to perform operations performed by the transceiver module 1920 in the foregoing embodiment. The transceiver 2030 may be one functional component, and the functional component may complete both a receiving function and a sending function. Alternatively, the transceiver 2030 may be a general term of two functional components, and the two functional components are a transmitter and a receiver. The transmitter is configured to complete a function of the terminal device 2000 in sending information to another device, and the receiver is configured to complete a function of the terminal device 2000 in receiving information from the another device.

It should be understood that the terminal device 1900 or the terminal device 2000 in the embodiments of this application may correspond to the terminal device in the embodiment shown in FIG. 10, and operations and/or functions of the modules in the terminal device 1500 or the terminal device 2000 are intended to implement corresponding procedures in the embodiment shown in FIG. 10. For brevity, details are not described herein again.

Figure 21:
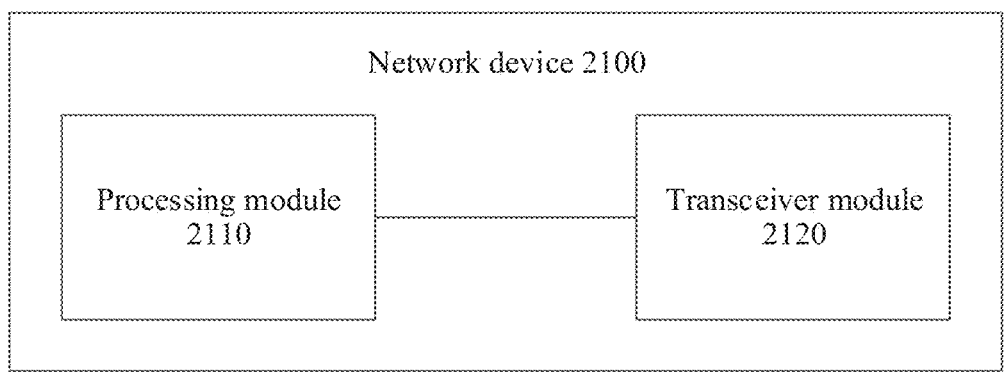
FIG. 21 is a schematic block diagram of a third network device according to an embodiment of this application.

FIG. 21 is a schematic block diagram of a communication device 2100 according to an embodiment of this application. For example, the communication device 2100 is a network device 2100. The network device 2100 includes a processing module 2110 and a transceiver module 2120. The processing module 2110 may be configured to perform all operations, such as a step of determining a default operating frequency, that are performed by the network device in the embodiment shown in FIG. 10 except sending and receiving operations, and/or configured to support another process of the technology described in this specification. The transceiver module 2120 may be configured to perform all the sending and receiving operations, such as S101 and S102, that are performed by the network device in the embodiment shown in FIG. 10, and/or configured to support another process of the technology described in this specification. The transceiver module 2120 may be one functional module, or may be a general term of two functional modules. The two functional modules are a sending module and a receiving module. The sending module is configured to perform all the sending operations performed by the network device in the embodiment shown in FIG. 10, and/or is configured to support another process of the technology described in this specification. The receiving module is configured to perform all the receiving operations performed by the network device in the embodiment shown in FIG. 10, and/or is configured to support another process of the technology described in this specification.

For example, the transceiver module 2120 is configured to send first signaling to a terminal device, where the first signaling indicates the default operating frequency of the terminal device.

The transceiver module 2120 is further configured to receive an uplink signal from the terminal device on a first uplink carrier.

In an optional implementation, the default operating frequency is determined based on a frequency corresponding to an uplink carrier on which a PUCCH is configured for the terminal device.

It should be understood that the processing module 2110 in this embodiment of this application may be implemented by a processor or a processor-related circuit component, and the transceiver module 2120 may be implemented by a transceiver or a transceiver-related circuit component.

Figure 22:
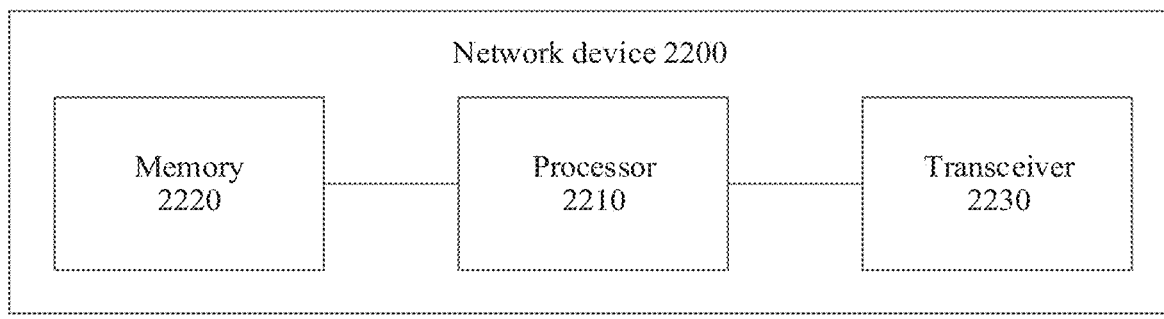
FIG. 22 is another schematic block diagram of a third network device according to an embodiment of this application.

As shown in FIG. 22, an embodiment of this application further provides a communication device 2200. For example, the communication device 2200 is a network device 2200. The network device 2200 includes a processor 2210, a memory 2220, and a transceiver 2230. The memory 2220 stores instructions or a program. The processor 2210 is configured to execute the instructions or the program stored in the memory 2220. When the instructions or the program stored in the memory 2220 are/is executed, the processor 2210 is configured to perform operations performed by the processing module 2110 in the foregoing embodiment, and the transceiver 2230 is configured to perform operations performed by the transceiver module 2120 in the foregoing embodiment. The transceiver 2230 may be one functional component, and the functional component may complete both a receiving function and a sending function. Alternatively, the transceiver 2230 may be a general term of two functional components, and the two functional components are a transmitter and a receiver. The transmitter is configured to complete a function of the network device 2200 in sending information to another device, and the receiver is configured to complete a function of the network device 2200 in receiving information from the another device.

It should be understood that the network device 2100 or the network device 2200 in the embodiments of this application may correspond to the network device in the embodiment shown in FIG. 10, and operations and/or functions of the modules in the network device 2100 or the network device 2200 are intended to implement corresponding procedures in the embodiment shown in FIG. 10. For brevity, details are not described herein again.

An embodiment of this application further provides a communication apparatus, and the communication apparatus may be a terminal device or a circuit. The communication apparatus may be configured to perform actions performed by the terminal device in the method embodiment shown in FIG. 7, actions performed by the terminal device in the method embodiment shown in FIG. 8, or actions performed by the terminal device in the method embodiment shown in FIG. 10.

Figure 23:
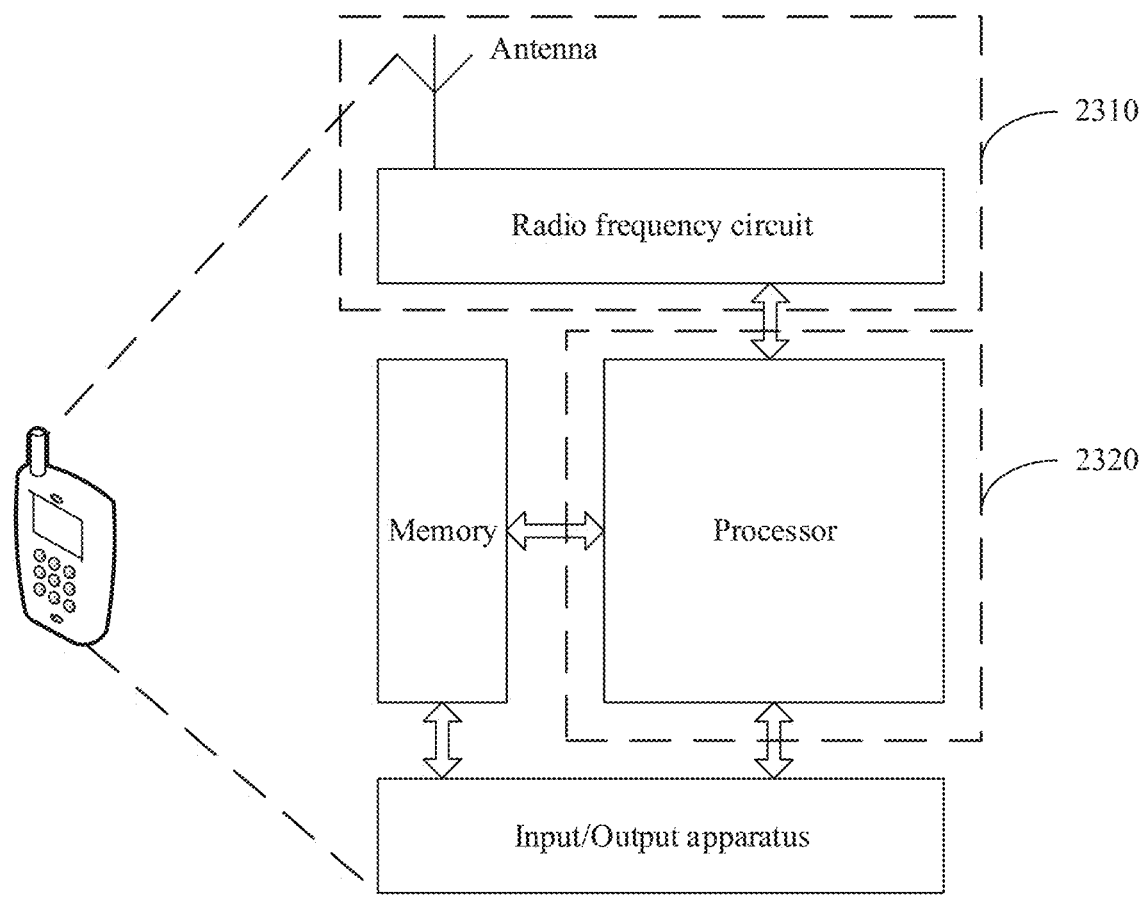
FIG. 23 is a schematic block diagram of a communication apparatus according to an embodiment of this application.

When the communication apparatus is a terminal device, FIG. 23 is a simplified schematic diagram of a structure of a terminal device. For ease of understanding and illustration, an example in which the terminal device is a mobile phone is used in FIG. 23. As shown in FIG. 23, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, or a keyboard, is mainly configured to receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 23 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 23, the terminal device includes a transceiver unit 2310 and a processing unit 2320. The transceiver unit may also be referred to as a transceiver, a transceiver apparatus, or the like. The processing unit may also be referred to as a processor, a processing board, a processing module, a processing apparatus, or the like. Optionally, a component for implementing the receiving function in the transceiver unit 2310 may be considered as a receiving unit, and a component for implementing the sending function in the transceiver unit 2310 may be considered as a sending unit. In other words, the transceiver unit 2310 includes the receiving unit and the sending unit. The transceiver unit may also be sometimes referred to as a transceiver, a transceiver circuit, or the like. The receiving unit may also be sometimes referred to as a receiver, a receiver circuit, or the like. The sending unit may also be sometimes referred to as a transmitter, a transmitter circuit, or the like.

It should be understood that the transceiver unit 2310 is configured to perform a sending operation and a receiving operation on a terminal device side in the method embodiment shown in FIG. 7, and the processing unit 2320 is configured to perform an operation other than the sending and receiving operations on the terminal device side in the method embodiment shown in FIG. 7.

For example, in an implementation, the transceiver unit 2310 is configured to perform all sending and receiving steps such as S71 and S72 on the terminal device side in the embodiment shown in FIG. 7. The processing unit 2320 is configured to perform an operation such as S73 other than the sending and receiving operations on the terminal device side in the embodiment shown in FIG. 7, and/or configured to support another process of the technology described in this specification.

Alternatively, the transceiver unit 2310 is configured to perform a sending operation and a receiving operation on a terminal device side in the method embodiment shown in FIG. 8, and the processing unit 2320 is configured to perform an operation other than the sending and receiving operations on the terminal device side in the method embodiment shown in FIG. 8.

For example, in an implementation, the transceiver unit 2310 is configured to perform all sending and receiving steps such as S81 on the terminal device side in the embodiment shown in FIG. 8. The processing unit 2320 is configured to perform an operation such as S83 other than the sending and receiving operations on the terminal device side in the embodiment shown in FIG. 8, and/or configured to support another process of the technology described in this specification.

Alternatively, the transceiver unit 2310 is configured to perform a sending operation and a receiving operation on a terminal device side in the method embodiment shown in FIG. 10, and the processing unit 2320 is configured to perform an operation other than the sending and receiving operations on the terminal device side in the method embodiment shown in FIG. 10.

For example, in an implementation, the transceiver unit 2310 is configured to perform all sending and receiving steps such as S101 and S102 on a first device side in the embodiment shown in FIG. 10. The processing unit 2320 is configured to perform an operation such as S103 other than the sending and receiving operations on the first device side in the embodiment shown in FIG. 10, and/or configured to support another process of the technology described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 24:
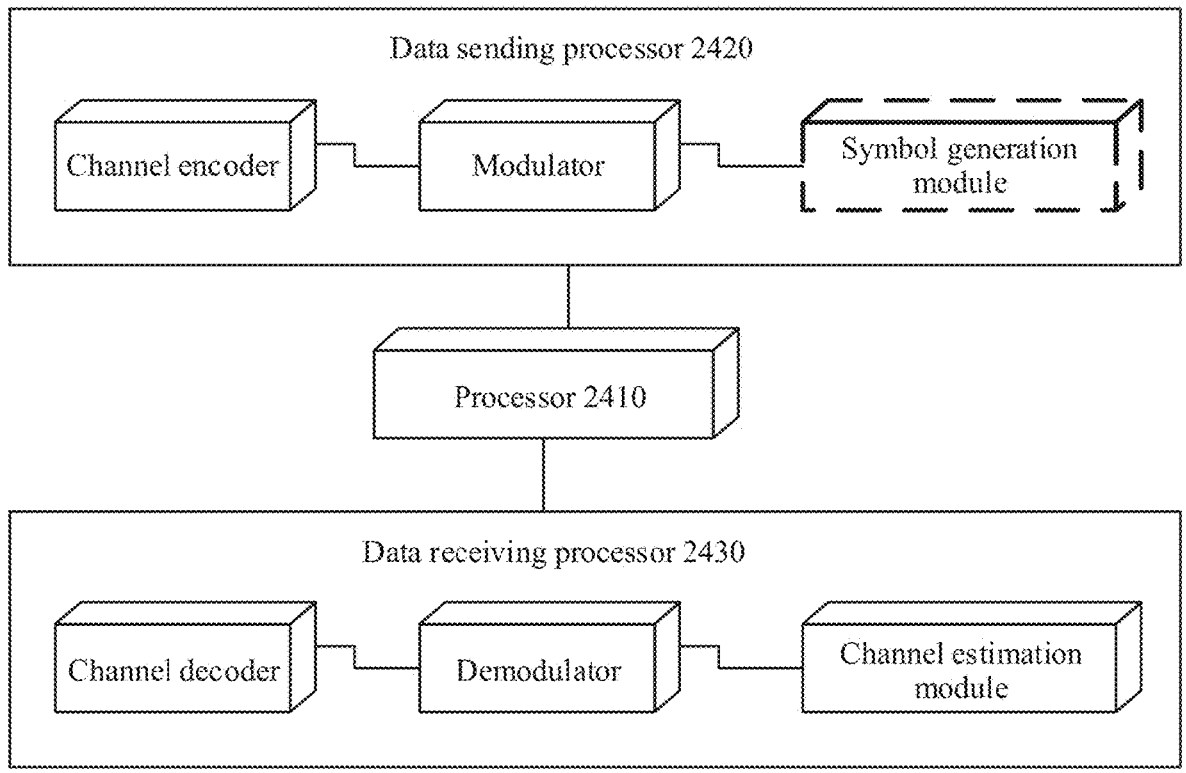
FIG. 24 is another schematic block diagram of a communication apparatus according to an embodiment of this application.

When the communication apparatus in this embodiment of this application is the terminal device, refer to a device shown in FIG. 24. In an example, the device may implement functions similar to functions of a processor 2410 in FIG. 24. In FIG. 24, the device includes the processor 2410, a data sending processor 2420, and a data receiving processor 2430. The processing module 1110 in the foregoing embodiment may be the processor 2410 in FIG. 24, and completes corresponding functions; and the transceiver module 1120 in the foregoing embodiment may be the data sending processor 2420 and/or the data receiving processor 2430 in FIG. 24. Alternatively, the processing module 1510 in the foregoing embodiment may be the processor 2410 in FIG. 24, and completes corresponding functions; and the transceiver module 1520 in the foregoing embodiment may be the data sending processor 2420 and/or the data receiving processor 2430 in FIG. 24. Alternatively, the processing module 1910 in the foregoing embodiment may be the processor 2410 in FIG. 24, and completes corresponding functions; and the transceiver module 1920 in the foregoing embodiment may be the data sending processor 2420 and/or the data receiving processor 2430 in FIG. 24.

Although FIG. 24 shows a channel encoder and a channel decoder, it may be understood that these modules are merely examples, and do not constitute a limitation on this embodiment.

Figure 25:
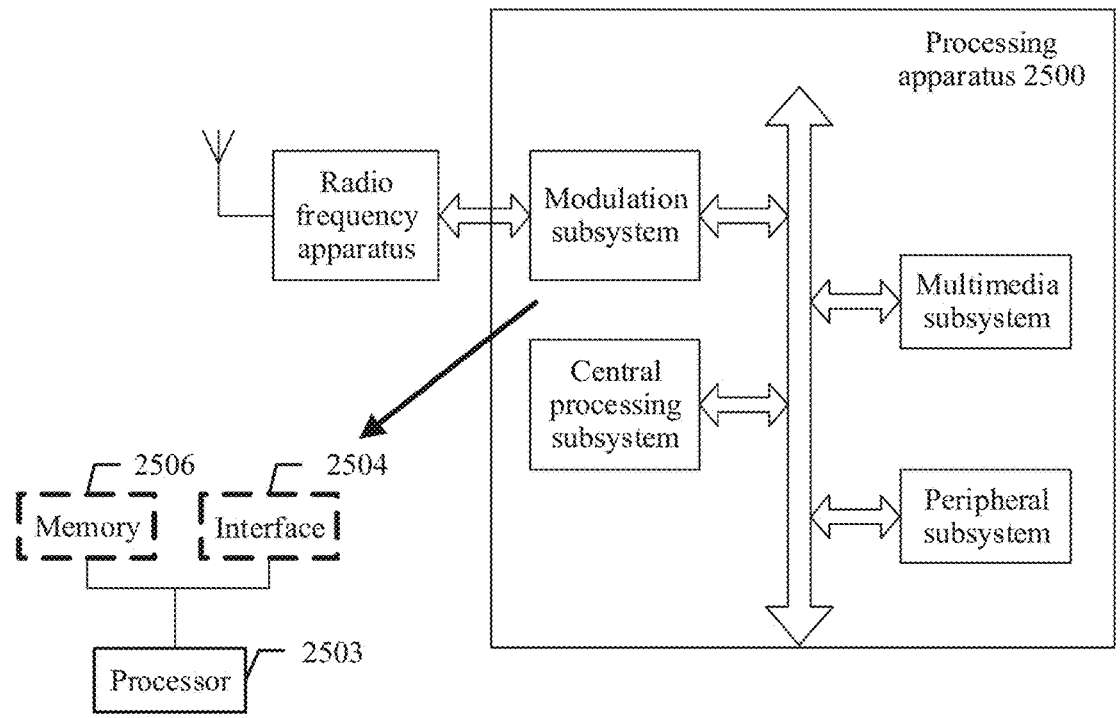
FIG. 25 is still another schematic block diagram of a communication apparatus according to an embodiment of this application.

FIG. 25 shows another form of this embodiment. A processing apparatus 2500 includes modules such as a modulation subsystem, a central processing subsystem, and a peripheral subsystem. The communication apparatus in this embodiment may be used as the modulation subsystem in the processing apparatus 2500. Specifically, the modulation subsystem may include a processor 2503 and an interface 2504. The processor 2503 implements functions of the processing module 1110, and the interface 2504 implements functions of the transceiver module 1120. Alternatively, the processor 2503 implements functions of the processing module 1510, and the interface 2504 implements functions of the transceiver module 1520. Alternatively, the processor 2503 implements functions of the processing module 1910, and the interface 2504 implements functions of the transceiver module 1920. In another variation, the modulation subsystem includes a memory 2506, a processor 2503, and a program that is stored in the memory 2506 and that can be run on the processor. When executing the program, the processor 2503 implements the method on a terminal device side in the method embodiment shown in FIG. 7, the method embodiment shown in FIG. 8, or the method embodiment shown in FIG. 10. It should be noted that the memory 2506 may be a non-volatile memory, or may be a volatile memory. The memory 2506 may be located inside the modulation subsystem, or may be located in the processing apparatus 2500, provided that the memory 2506 can be connected to the processor 2503.

An embodiment of this application further provides a communication system. The communication system may include the terminal device in the embodiment shown in FIG. 7, and include the network device in the embodiment shown in FIG. 7. The terminal device is, for example, the terminal device 1100 in FIG. 11 or the terminal device 1200 in FIG. 12, and the network device is, for example, the network device 1300 in FIG. 13 or the network device 1400 in FIG. 14. For example, the terminal device may be configured to perform all operations performed by the terminal device in the embodiment shown in FIG. 7 such as S71, S72, and S73 in the embodiment shown in FIG. 7, and/or configured to support another process of the technology described in this specification. The network device may be configured to perform all operations performed by the network device in the embodiment shown in FIG. 7 such as S71 and S72 in the embodiment shown in FIG. 7, and/or configured to support another process of the technology described in this specification.

An embodiment of this application further provides a communication system. The communication system may include the terminal device in the embodiment shown in FIG. 8, and include the network device in the embodiment shown in FIG. 8. The terminal device is, for example, the terminal device 1500 in FIG. 15 or the terminal device 1600 in FIG. 16, and the network device is, for example, the network device 1700 in FIG. 17 or the network device 1800 in FIG. 18. For example, the terminal device may be configured to perform all operations performed by the terminal device in the embodiment shown in FIG. 8 such as S81 and S83 in the embodiment shown in FIG. 8, and/or configured to support another process of the technology described in this specification. The network device may be configured to perform all operations performed by the network device in the embodiment shown in FIG. 8 such as S81 and S82 in the embodiment shown in FIG. 8, and/or configured to support another process of the technology described in this specification.

An embodiment of this application further provides a communication system. The communication system may include the terminal device in the embodiment shown in FIG. 10, and include the network device in the embodiment shown in FIG. 10. The terminal device is, for example, the terminal device 1900 in FIG. 19 or the terminal device 2000 in FIG. 20, and the network device is, for example, the network device 2100 in FIG. 21 or the network device 2200 in FIG. 22. For example, the terminal device may be configured to perform all operations performed by the terminal device in the embodiment shown in FIG. 10 such as S101, S102, and S103 in the embodiment shown in FIG. 10, and/or configured to support another process of the technology described in this specification. The network device may be configured to perform all operations performed by the network device in the embodiment shown in FIG. 10 such as S101 and S102 in the embodiment shown in FIG. 10, and/or configured to support another process of the technology described in this specification.

The three communication systems may be a same communication system or different communication systems; or two of the three communication systems may be a same communication system, and the other is a different communication system.

An embodiment of this application further provides a computer-readable storage medium. The computer-readable storage medium stores a computer program. When the program is executed by a processor, a procedure related to a terminal device in the embodiment shown in FIG. 7 provided in the foregoing method embodiments may be implemented.

An embodiment of this application further provides a computer-readable storage medium. The computer-readable storage medium stores a computer program. When the program is executed by a processor, a procedure related to a network device in the embodiment shown in FIG. 7 provided in the foregoing method embodiments may be implemented.

An embodiment of this application further provides a computer-readable storage medium. The computer-readable storage medium stores a computer program. When the program is executed by a processor, a procedure related to a terminal device in the embodiment shown in FIG. 8 provided in the foregoing method embodiments may be implemented.

An embodiment of this application further provides a computer-readable storage medium. The computer-readable storage medium stores a computer program. When the program is executed by a processor, a procedure related to a network device in the embodiment shown in FIG. 8 provided in the foregoing method embodiments may be implemented.

An embodiment of this application further provides a computer-readable storage medium. The computer-readable storage medium stores a computer program. When the program is executed by a processor, a procedure related to a terminal device in the embodiment shown in FIG. 10 provided in the foregoing method embodiments may be implemented.

An embodiment of this application further provides a computer-readable storage medium. The computer-readable storage medium stores a computer program. When the program is executed by a processor, a procedure related to a network device in the embodiment shown in FIG. 10 provided in the foregoing method embodiments may be implemented.

An embodiment of this application further provides a computer program product including instructions. When the instructions are executed, a method on a terminal device side in the method embodiment shown in FIG. 7 is performed.

An embodiment of this application further provides a computer program product including instructions. When the instructions are executed, a method on a network device side in the method embodiment shown in FIG. 7 is performed.

An embodiment of this application further provides a computer program product including instructions. When the instructions are executed, a method on a terminal device side in the method embodiment shown in FIG. 8 is performed.

An embodiment of this application further provides a computer program product including instructions. When the instructions are executed, a method on a network device side in the method embodiment shown in FIG. 8 is performed.

An embodiment of this application further provides a computer program product including instructions. When the instructions are executed, a method on a terminal device side in the method embodiment shown in FIG. 10 is performed.

An embodiment of this application further provides a computer program product including instructions. When the instructions are executed, a method on a network device side in the method embodiment shown in FIG. 10 is performed.

It should be understood that, the processor in the embodiments of this application may be a central processing unit (central processing unit, CPU), or may be another general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate, a transistor logic device, a discrete hardware component, or the like. The general purpose processor may be a microprocessor, or the processor may be any conventional processor or the like.

It should be further understood that the memory in the embodiments of this application may be a volatile memory, or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in an electronic form, a mechanical form, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing description is merely specific implementations of this application, but is not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A communication method, comprising:
   sending a first uplink signal to a network device on a first uplink carrier,
   receiving first signaling from the network device, wherein
   the first signaling indicates a terminal device to send a second uplink signal to the network device on a second uplink carrier, and the first signaling further indicates the terminal device to switch the operating frequency of a radio frequency link of a transmit antenna of the terminal device to a second frequency, and
   switching the operating frequency of a radio frequency link of the transmit antenna the terminal device to the second frequency, and sending the second uplink signal on the second uplink carrier.

2. The method according to claim 1, wherein the second frequency corresponds to the second uplink carrier.

3. The method according to claim 1, wherein
   the first uplink carrier is a new radio (NR) uplink carrier or a long term evolution (LTE) uplink carrier; or,
   the second uplink carrier is a NR uplink carrier or a LTE uplink carrier; or
   the first uplink carrier and the second uplink carrier correspond to uplink carriers of different cells.

4. The method according to claim 1, wherein the second frequency is 3.5 GHz or 1.8 GHz.

5. The method according to claim 1, wherein the first signaling is downlink control information (DCI) or high level signaling.

6. A communication method, comprising:
   receiving a first uplink signal from a terminal device on a first uplink carrier,
   sending first signaling to the terminal device, wherein
   the first signaling indicates to send a second uplink signal to a network device on a second uplink carrier, and the first signaling further indicates the terminal device to switch the operating frequency of a radio frequency link of a transmit antenna of the terminal device to a second frequency, and
   receiving the second uplink signal from the terminal device on the second uplink carrier.

7. The method according to claim 6, wherein
   the second frequency corresponds to the second uplink carrier.

8. The method according to claim 6, wherein
   the first uplink carrier is a new radio (NR) uplink carrier or a long term evolution (LTE) uplink carrier; or,
   the second uplink carrier is a NR uplink carrier or a LTE uplink carrier; or
   the first uplink carrier and the second uplink carrier correspond to uplink carriers of different cells.

9. The method according to claim 6, wherein the second frequency is 3.5 GHz or 1.8 GHz.

10. The method according to claim 6, wherein the first signaling is downlink control information (DCI) or high level signaling.

11. An apparatus, comprising:
    a transceiver;
    a processor; and
    a computer-readable medium including computer-executable instructions that, when executed by the processor, cause the apparatus to perform operations:
    sending, by using the transceiver, a first uplink signal to a network device on a first uplink carrier,
    receiving, by using the transceiver, first signaling from the network device, wherein
    the first signaling indicates to send a second uplink signal to the network device on a second uplink carrier, and the first signaling further indicates the apparatus to switch the operating frequency of a radio frequency link of a transmit antenna of the apparatus to a second frequency, and
    switching the operating frequency of a radio frequency link of the transmit antenna of the apparatus to the second frequency, and sends the second uplink signal on the second uplink carrier.

12. The apparatus according to claim 11, wherein
    the second frequency corresponds to the second uplink carrier.

13. The apparatus according to claim 11, wherein
    the first uplink carrier is a new radio (NR) uplink carrier or a long term evolution (LTE) uplink carrier; or,
    the second uplink carrier is a NR uplink carrier or a LTE uplink carrier; or
    the first uplink carrier and the second uplink carrier correspond to uplink carriers of different cells.

14. The apparatus according to claim 11, wherein the second frequency is 3.5 GHz or 1.8 GHz.

15. The apparatus according to claim 11, wherein the first signaling is downlink control information (DCI) or high level signaling.

16. An apparatus, comprising:
a transceiver, configured to
one or more processors; and
a computer-readable medium including computer-executable instructions that, when executed by the one or more processors, cause the apparatus to perform operations including:
receiving, by using the transceiver, a first uplink signal from a terminal device on a first uplink carrier,
sending, by using the transceiver, first signaling to the terminal device, wherein
the first signaling indicates to send a second uplink signal to the apparatus on a second uplink carrier, and the first signaling further indicates the terminal device to switch the operating frequency of a radio frequency link of a transmit antenna of the terminal device to a second frequency, and
receiving the second uplink signal from the terminal device on the second uplink carrier.

17. The apparatus according to claim 16, wherein the second frequency corresponds to the second uplink carrier.

18. The apparatus according to claim 16, wherein
the first uplink carrier is a new radio (NR) uplink carrier or a long term evolution (LTE) uplink carrier; or
the second uplink carrier is a NR uplink carrier or a LTE uplink carrier; or
the first uplink carrier and the second uplink carrier correspond to uplink carriers of different cells.

19. The apparatus according to claim 16, wherein the second frequency is 3.5 GHz or 1.8 GHz.

20. The apparatus according to claim 16, wherein the first signaling is downlink control information (DCI) or high level signaling.

* * * * *